(12) United States Patent
Sower

(10) Patent No.: US 6,508,078 B2
(45) Date of Patent: Jan. 21, 2003

(54) SEPARATION OF PURIFIED WATER AND NUTRIENTS FROM AGRICULTURAL AND FARM WASTES

(75) Inventor: Larry P. Sower, Milford, UT (US)

(73) Assignee: Crystal Peak Farms, Milford, UT (US)

( * ) Notice: Subject to any disclaimer, the term of this patent is extended or adjusted under 35 U.S.C. 154(b) by 0 days.

(21) Appl. No.: 10/038,294

(22) Filed: Oct. 23, 2001

(65) Prior Publication Data

US 2002/0084227 A1 Jul. 4, 2002

Related U.S. Application Data

(60) Provisional application No. 60/243,597, filed on Oct. 26, 2000.

(51) Int. Cl.$^7$ ................................................. B01D 9/04
(52) U.S. Cl. ...................................................... 62/532
(58) Field of Search ........................... 62/532, 541, 123

(56) References Cited

U.S. PATENT DOCUMENTS

| | | |
|---|---|---|
| 3,137,270 A | 6/1964 | Rigterink et al. |
| 3,175,535 A | 3/1965 | Rigterink |
| 3,633,547 A | 1/1972 | Stevens |
| 3,677,405 A | 7/1972 | Keith, Jr. ...................... 210/71 |
| 3,792,184 A | 2/1974 | Inagami et al. ............. 426/369 |
| 3,885,399 A | 5/1975 | Campbell ..................... 62/123 |
| 3,892,662 A | 7/1975 | Stout ........................... 210/66 |
| 3,939,280 A | 2/1976 | Karnemaat |
| 3,992,900 A | 11/1976 | Campbell ..................... 62/541 |
| 4,109,019 A | 8/1978 | Moore |
| 4,128,946 A | 12/1978 | Maffet |
| 4,175,515 A | 11/1979 | Bradley |
| 4,176,090 A | 11/1979 | Vaughan et al. |
| 4,193,206 A | 3/1980 | Maffet |
| 4,236,382 A | 12/1980 | Cheng et al. ................. 62/537 |

(List continued on next page.)

FOREIGN PATENT DOCUMENTS

| | | |
|---|---|---|
| EP | 0 005 113 A1 | 10/1979 |
| EP | 0 114 038 A2 | 7/1984 |
| JP | 404036131 A | 2/1992 |

OTHER PUBLICATIONS

Boysen, et al, "Evaluation of the Natural Freeze–Thaw Process for the Desalinization of Groundwater from the North Dakota Aquifer to Provide Water for Grand Forks, North Dakota", U.S. Department of the Interior, Sep. 1999.

McCormack, et al., "Clathrate Desalination Plant Preliminary Research Study", U.S. Department of the Interior, Jun. 1995.

Cody, "RS20569: Water Resource Issues in the 106th Congress", Congressional Research Service, Sep. 2000.

Vajpeyi, "Water Resource Management", Greenwood Publishing Group, Inc., Oct., 2000.

Anderson, "Freshwater: a Scarce Resource", Down to Earth, vol. 8 No. 8 Sep. 1999.

Manning, "Safety of water supply is threatened worldwide", USA Today, Jun. 1996.

Harju, et al. "Treating Produced Waters in the San Juan Basin with the Freeze–Thaw/Evapoartion Process", 1997.

(List continued on next page.)

Primary Examiner—William C. Doerrler
Assistant Examiner—Malik N. Drake
(74) Attorney, Agent, or Firm—Workman, Nydegger & Seeley

(57) ABSTRACT

Methods and systems for separation of purified water and nutrients from organic waste. Separated purified water can be used as fresh water in agricultural and farm operations, and nutrients can be converted to fertilizers. Treated organic waste includes complex organic waste with settleable and nonsettleable material that has not been subjected to a conventional lagoon primary treatment. These methodology eliminates the need for land application of residual waste stream and it comprises operations such as controlled freezing and thawing, and optionally evaporation.

40 Claims, 8 Drawing Sheets

U.S. PATENT DOCUMENTS

| | | | |
|---|---|---|---|
| 4,245,396 A | 1/1981 | Maffet | |
| 4,262,489 A | 4/1981 | Sakamoto | 62/124 |
| 4,262,633 A | 4/1981 | Taboga | |
| 4,278,699 A | 7/1981 | Yoshizawa et al. | |
| 4,310,552 A | 1/1982 | Duchstein | |
| 4,353,328 A | 10/1982 | Steidinger | |
| 4,402,282 A | 9/1983 | Steidinger | |
| 4,420,318 A | 12/1983 | Cheng et al. | 62/542 |
| 4,505,728 A | 3/1985 | Cheng et al. | 62/542 |
| 4,519,831 A | 5/1985 | Moore | |
| 4,560,400 A | 12/1985 | Allan et al. | |
| 4,572,785 A | 2/1986 | Braaten | 210/181 |
| 4,642,131 A | 2/1987 | Hoitink | |
| 4,710,300 A | 12/1987 | Kristoufek | |
| 4,743,287 A | 5/1988 | Robinson | |
| 4,765,900 A | 8/1988 | Schwoyer et al. | |
| 4,795,711 A | 1/1989 | Nockemann | |
| 4,799,945 A | 1/1989 | Chang | 62/532 |
| 4,810,274 A | 3/1989 | Cheng et al. | 62/12 |
| 4,832,728 A | 5/1989 | Allan et al. | |
| 4,845,888 A | 7/1989 | Lahalih et al. | |
| 4,872,993 A | 10/1989 | Harrison | |
| 4,900,348 A | 2/1990 | Hoitink | |
| 4,936,114 A | 6/1990 | Engdahl et al. | 62/532 |
| 4,997,469 A | 3/1991 | Moore | |
| 5,021,077 A | 6/1991 | Moore | |
| 5,021,247 A | 6/1991 | Moore | |
| 5,037,463 A | 8/1991 | Engdahl et al. | 62/532 |
| 5,055,124 A | 10/1991 | Nguyen et al. | |
| 5,059,228 A | 10/1991 | Cheng | 62/532 |
| 5,062,387 A | 11/1991 | Anderson | |
| 5,071,559 A | 12/1991 | Bleeker | |
| 5,087,474 A | 2/1992 | Moore | |
| 5,093,262 A | 3/1992 | Kimura | |
| 5,118,336 A | 6/1992 | Biez | |
| 5,181,396 A | 1/1993 | Saari | 62/541 |
| 5,266,201 A | 11/1993 | Letourneux et al. | |
| 5,378,257 A | 1/1995 | Higashida | |
| 5,388,414 A | 2/1995 | Cheng | 62/12 |
| 5,393,317 A | 2/1995 | Robinson | |
| 5,400,619 A | 3/1995 | Husseiny et al. | 62/532 |
| 5,411,568 A | 5/1995 | Moore | |
| 5,422,015 A | 6/1995 | Angell et al. | |
| 5,433,766 A | 7/1995 | Ming et al. | |
| 5,443,613 A | 8/1995 | Robinson | |
| 5,443,733 A | 8/1995 | Mueller et al. | 210/651 |
| 5,458,877 A | 10/1995 | Obayashi et al. | |
| 5,482,528 A | 1/1996 | Angell et al. | |
| 5,545,326 A | 8/1996 | Petering | |
| 5,549,730 A | 8/1996 | Aoki et al. | |
| 5,558,778 A | 9/1996 | Janssen et al. | 210/774 |
| 5,593,099 A | 1/1997 | Langenecker | |
| 5,614,107 A | 3/1997 | Mallia, Jr. | 210/771 |
| 5,726,405 A * | 3/1998 | White | 210/718 |
| 5,865,143 A | 2/1999 | Moore, Jr. | |
| 5,890,454 A | 4/1999 | Moore, Jr. | |
| 5,914,104 A | 6/1999 | Moore, Jr. | |
| 5,950,565 A | 9/1999 | Guyot | |
| 6,083,386 A | 7/2000 | Lloyd | |
| 6,190,556 B1 | 2/2001 | Kolber | |
| 6,409,788 B1 * | 6/2002 | Sower | 71/11 |

OTHER PUBLICATIONS

Various reports on DWPR: DesalR&D; and WTTP Reports Library.

"Water Treatment Technology Program–Authorization Closed", 1997.

Martella, "The Water Desalination Research & Development Program", Newsletter–No. 11, Summer 1998.

Sauchelli, Conversion of Ammonia to Fertilizer Materials, Chemistry and Technology of Fertilizers, pp. 33 34, 1960.

Fischer et al., Anaerobic digestion in Swine Wastes, Energy, Agriculture and Waste Management, Proceedings of the 1975 Cornell Agriculture Waste Management Conference, pp. 307–352, 1975.

Hanna et al., Chemical Coagulation of Methane Producing Solids From Flushing Wastewaters, Agricultural Waste Utilization and Management, Proceedings of the Fifth International Symposiumon Agricultural Wastes, pp. 632–637, 1985.

Kang et al., Nutrient Removal and Recovery From Municipal Wastewater by Selective Ion Exchange, Paper on South Lyon, Michigan Study, pp. 1149–1172, 1986.

Sievers, Rapid Mixing Influences on Chemical Coagulation of Manures, Biological Wastes, vol. 28, pp. 103–114, 1989.

Webb and Ho, Struvite ($MgNH_4PO_46H_2O$) Solubility and its Application to a Piggery EffluentProblem, Wm Sci. Tech., vol. 26, No. 9–11, pp. 2228–2232, 1992.

Liao et al., Chemical Precipitation of Phosphate and Ammonia From Swine Wastewater, Biomass and Bioenergy, vol. 4, No. 5, pp. 365–371, 1993.

Gao et al., Chemical Treatment of Swine Wastewater, J. Environ. Sci. Health, A28(4), pp. 795–807, 1993.

Piccinini, Application of a Phillipsite Rich Zeolitite During the Composting of Solid Fractions of Pig Slurry, Materials Engineering, vol. 5, n.2, pp. 375–381, 1994.

Maqueda et al., Study of Struvite Precipitation in Anerobic Digesters, Wat. Res., vol. 28, No. 2, pp. 411–416, 1994.

Liberti and Lopez, Applications of a New Physicochemical Method for Removal and Recovery of Nutrients From Wastewater, Nutrient Removal From Wastewaters, Technomic Pub. Co., Inc.,pp. 317–378, 1994.

Jewell, Resource–Recovery Wastewater Treatment, American Scientist, vol. 82, pp. 366–375, 1994.

Vincini et al., Use of Alkaline Fly Ash as an Amendment for Swine Manure, Bioresource Technology, vol. 49, pp. 213–222, 1994.

Barrington and Moueddeb, Zeolite to Control Swine Manure Odours and Nitrogen Volatilization, New Knowledge in Livestock Odor Solutions, Proceedings of International Livestock Odor Conference '95, pp. 65–68, 1995.

Swine Production–Waste Management and Utilization, Waste Management and Utilization in Food Production and Processing, Task Force Report No. 124, pp. 42–109, 1995.

Liberti et al., Ammonium and Phosphorus Removal from Wastewater Using Clinoptilolite: A Review of the Rim–Nut Process, Natural Zeolites '93, pp. 351–362, 1995.

Sommer et al., Ammonia Volatilization from Pig Slurry Applied with Trail Hoses or Broadspread to Winter Wheat: Effects of Crop Developmental Stage, Microclimate, and Leaf Ammonia Absorption, Ecosystem Processes, J. Environ. Qual., vol. 26, pp. 1153–1160, 1997.

Liu et al., Phosphorus Recovery in Surface Runoff from Swine Lagoon Effluent by Overland Flow, Water Quality, J. Environ. Qual., vol. 26, pp. 995–1001, 1997.

Environmental Risks of Livestock & Poultry Production, Animal Waste Pollution in America: An Emerging National Problem, Report Compiled by the Minority Staff of the United States Committee on Agriculture, Nutrition, & Forestry, pp. 1–27, 1997.

State News, BNA Environment Reporter, vol. 28, No. 40, pp. 2133–2134, 1998.

*Strategy for Addressing Environmental and Public Health Impacts from Animal Feeding Operations,* U.S. EPA AFO Strategy, pp. 1–21, 1998.

National Legislation Needed to Address Animal Waste Pollution, *Environment Reporter,* vol. 28, No. 48, p. 2647, Apr. 10, 1998.

Federal Role in Animal Waste Control Should be Limited, *Environment Reporter,* vol. 29, No. 3, p. 178, May 15, 1998.

Safley, Jr. et al., Capturing Methane for Fuel and Other Strategies for Managing Swine Lagoon Waste, pp. 38–41.

Safley Jr., et al., Low Temperature Lagoon Digester for Biogas Production from Swine Manure, pp. 1–18.

Safley Jr., et al., Low Temperature Anaerobic Digester, NC Department of Economic and Community Development, pp. 1–13.

Norrman, Anaerobic Treatment of Piggery Waste—Thermophilic Digestion of the Solids Phase and Mesophilic Treatment of the Liquid Phase, *Biomass Conversion,* vol. 3, pp. 14–16, (Abstract) Proceedings of Bioenergy Conference, 1984.

Ghederim et al., Present State and Trends in Animal Farm Wastes, (Abstract) 5th International Symposium on Agricultureal Wastes, pp. 426–430, 1985.

Duarte et al., Treatment of Slaughterhouse Wastewaters, in Stabilization Ponds, (Abstract) *Water Science and Technology,* vol. 19, pp. 85–91, 1987.

Keeley and Skipper, The Use of Aerobic Thermophilic Composting for the Stabilization of Primary Meat Waste Solids, (Abstract) *Alternative Waste Treatment Systems,* pp. 120–131, 1988.

Sievers, Rapid Mixing Influences on Chemical Coagulation of Manures, (Abstract) *Biological Wastes,* vol. 28, pp. 103–114, 1989.

Provolo et al., Technical–Economic Evaluation of the Options for the Digestion of Pig Slurry, *Genio Rurale,* vol. 56(2), pp. 19–26, 1993.

H.M. Keener, et al, Composting & Value–Added Utilization of Manure from a High–Rise™ Swine Finishing Facility, ASAE Meeting Presentation, Paper No. 004143, Midwest Express Center, Milwaukee, Wisconsin, Jul. 9–12, 2000.

\* cited by examiner

SEPARATION OF PURIFIED WATER AND NUTRIENTS FROM AGRICULTURAL AND FARM WASTES

RELATED APPLICATIONS

This application claims priority to U.S. Provisional Patent Application Serial No. 60/243,597, filed on Oct. 26, 2000, which application is incorporated herein by specific reference.

BACKGROUND OF THE INVENTION

1. The Field of the Invention

The present invention relates generally to the treatment of waste such as agricultural and livestock waste. More specifically, the present invention relates to the separation of valuable components, such as nutrients and purified water, from waste, such as agricultural and livestock waste, by a process that includes controlled freezing and thawing, and by a system that includes the devices to achieve the same.

2. Relevant Technology

Feedlots, animal barns, agroindustrial plants, municipal sewage, and farms that keep large numbers of animals are sources of enormous quantities of organic waste. The expression "organic waste source" will hereinafter refer to any of these sources of organic waste or to any source that similarly produces organic waste, although perhaps in different quantities or by different activities. Accordingly, "organic waste source" will hereinafter also refer to organic waste recycling and treatment plants that produce liquid and/or sludge from which purified water can be separated.

The disposal of untreated organic waste causes serious pollution problems which include those due to the waste's high content of chemically oxidizable components (expressed as COD, or chemical oxygen demand) and biochemically decomposable components (expressed as BOD, or biochemical oxygen demand). When these pollutants reach bodies of water, either because they leach from disposal sites or as a consequence of being directly released or transported into water bodies, they deoxygenate the receiving waters and impair the receiving waters' capability to support aquatic life.

Acridity and high pathogen content add to the COD and BOD problems of untreated waste disposal. Acrid gases released into the atmosphere are not only unpleasant but they can also contribute to acid deposition, global greenhouse effects, and ozone depletion.

According to background material provided by the US Environmental Protection Agency (EPA), "animal waste, if not managed properly, can run off farms and pollute nearby water bodies. Agricultural run off, rich in nutrients like nitrogen and phosphorous has been linked to dangerous toxic microorganisms such as *Pfisteria piscicida*. Pfisteria is widely believed to be responsible for major fish kills and disease events in several mid-Atlantic states and may pose a risk to human health." Draft Strategy for Animal Feeding Operations, EPA Memorandum, Mar. 4, 1998. See also EPA To Better Protect Public Health and The Environment From Animal Feeding Operations, EPA release of Mar. 5, 1998. In particular, the relationship between swine production and waste management problems has been reported in the Task Force Report No. 124, Council for Agricultural Science and Technology, *Waste Management and Utilization in Food Production and Processing*, October 1995, pp. 42–54, 110–121.

Notwithstanding the problems referred to above and other detrimental effects of the disposal of untreated organic waste, organic waste has nutritional value for plants and some forms of organic waste contain large quantities of water that could be recycled in purified, re-useable form. Land application of these dilute wastes is facing increased regulatory scrutiny. Furthermore, water in organic waste is highly polluted and it typically cannot be re-used directly even in agricultural and livestock operations. The alternative use of synthetic fertilizers is often adopted for increasing crop yield, but this solution carries at least two undesirable implications. First, a strategy that relies only on the use of synthetic fertilizers neglects the problem of organic waste disposal. Second, the manufacture of synthetic fertilizers frequently requires consumption of considerable amounts of energy and possibly expensive synthesis materials, sometimes involves polluting subprocesses, and may produce additional waste whose safe disposal is often expensive. In addition, the fast release of most synthetic fertilizers causes leaching, which in turn leads to wasted fertilizer and the ensuing pollution problems when the leached fertilizer accumulates in canals and other bodies of water. In addition to the foregoing two problems, polices that consider organic waste as an untreatable material neglect the recovery of the large quantities of water discarded with such waste, even though water is becoming a valuable and scarce resource.

The problems inherent to organic waste production and subsequent treatment require economical processes which avoid the afore-mentioned environmental problems. The efficiency of these processes is considerably enhanced when, in addition to providing a practical disposal of organic waste, the processes convert the organic waste into a useful product, such as commercial fertilizer, preferably a slow-release fertilizer and/or lead to the recovery of purified water that can be re-used in at least agricultural and/or livestock operations. This conversion requires the recovery of the nitrogenous products in the waste and their conversion into a fertilizer that can slowly release nitrogen in a form that plants can absorb. Because of the diversity of variables that determine the economic, chemical, and environmental aspects of this conversion problem, a variety of attempts to treat organic waste have been undertaken.

As indicated above, water is becoming a valuable and scarce resource to the extent that the availability of usable water limits municipal, industrial, and agricultural development in many areas. Methods for separating purified water from contaminated aqueous media have been disclosed.

These methods include the complete freezing and complete thawing of aqueous sludge to change the coagulation characteristics of the sludge for the purpose of achieving a subsequent more dense coagulation. Other methods rely on a combination of freezing with a mechanical treatment for separating precipitated material by complete freezing of the feed material followed by partial thawing and subsequent filtration or centrifugation. Some processes operate with contaminated feed that is mixed with immiscible refrigerant. Still other methods comprise the reduction of solid waste particles to atomizable size, the subsequent complete freezing of sprayed feed in a freezing chamber, and an eventual separation that requires the waste in permanent solid form. A number of methods rely on vacuum freezing with separation of low pressure water vapor and ice, or on solid-liquid-vapor multiple phase transformations. A variety of processes are designed so that a purified water component in contaminated water is frozen out in a freezer that relies on a conventional heat exchanger. Finally other methods rely on complete freezing followed by separation of volatile components and freeze-drying of the residue.

Natural freezing has been used in the purification of water produced in association with oil and natural gas production.

This type of water typically contains salts, heavy metals and organic materials that are found in the exploitation of oil and material gas formations.

A freeze-thaw/evaporation purification process has been used to treat water produced in conjunction with oil and natural gas extraction. This water reportedly contains dissolved solids at a total dissolved solid (TDS) concentration of 12,800 mg/L. The reported "net result was an 80 percent reduction in the volume of water requiring disposal. Only 1612 [barrels] of the original produced water volume [of 8000 barrels] remained with a final TDS concentration of 44,900 mg/L; the remainder having been either evaporated or purified to a level of 1010 mg/L [or about 1010 ppm]." *Treating Produced Waters in the San Juan Basin with Freeze-Thaw/Evaporation Process*, at <http://www.gri.org/pub/oldcontent/techn/e+p/gastips/fall97/treat.htm>, visited Jun. 16, 2000. This process reportedly operates in batch mode and when enough ice is accumulated over an elevated pipe framework, the ice is melted to recover purified water. See id. Dissolved solids in water treated according to this method are nonsettleable material. It would be desirable to provide a method and system for separating purified water from organic waste that contains settleable and nonsettleable material, such as organic waste produced in hog farms and other organic waste sources. This organic waste, in contrast with saline water and water associated with oil and gas production operations, is a more complex fluid because its composition includes setteable and nonsettleable materials such as suspended and dissolved solids, including fine solids of predominantly organic origin, various biomaterials and bio-related materials, various inorganic materials and their complexed and combined forms with the bio and bio-related materials, such materials being present in the complex organic waste in a variety of aggregation and phsyicochemical forms such as solution, suspension, and colloidal forms.

Still other methods have been reported for desalinating waters by freeze-thaw processes applied to aquifer waters. See, e.g., John E. Boysen, et al., *Evaluation of the Natural Freeze-Thaw Process for the Desalination of Groundwater From the North Dakota Aquifer to Provide Water for Grand Forks, North Dakota*, Water Treatment Technology Program Report No. 23, Water Treatment Engineering and Research Group, Technical Service Center, Bureau of Reclamation, U.S. Department of the Interior, September 1999.

Other water desalination processes rely on clathrate formation. See, e.g., Richard A. McCormack, et al., *Clathrate Desalination Plant Preliminary Research Study*, Water Treatment Technology Program Report No. 5, Water Treatment Engineering and Research Group, Technical Service Center, Bureau of Reclamation, U.S. Department of the Interior, June 1995. Still other methods to obtain purified water rely on distillation, filtration, and/or reverse osmosis. These processes require specialized facilities and typically require a high energy input.

Despite the plurality of methods for treating organic waste and for producing fertilizer and/or purified water, conventional methods leave unsolved problems. This is particularly the case regarding strategies that rely on encompassing and integrating organic waste treatment methods, fertilizer production processes for making fertilizer with desired environmental and agronomical properties, and/or separation of purified water from the waste. More specifically, there is a need for commercially successful organic waste treatment, fertilizer production and/or purified water recovery processes.

The composition of animal waste depends on both the kind of animal and the way the waste is handled. Poultry operations generally produce dry waste, with about 15%–25% moisture whereas hogs and cattle generate waste that is more liquid. In addition, water is typically used to flush hog and cattle waste out of barns and into storage facilities, thus producing a slurry that can be up to 97% liquid and it is typically stored either in earthen lagoons or in slurry tanks. In these conventional treatments, "many of the solids (including much of the phosphorous) settle into a sludge at the bottom. Most nitrogen remains dissolved in the water or volatilizes into the atmosphere. A farmer who utilizes the animal waste for nutrients pumps the liquid out for nutrients or irrigation, and may agitate the sludge at pumping time to capture the nutrients that otherwise would remain behind." *Animal Waste Pollution in America: An Emerging National Problem*, Environmental Risks of Livestock & Poultry Production, Report Compiled by the Minority Staff of the US Senate Committee on Agriculture, Nutrition, & Forestry for Sen. Tom Harkin, December 1997.

Most methods that rely on conventional lagoons do not clarify the effluent that carries the organic waste prior to its accumulation in the lagoon system. This practice leads to unnecessarily high loading of the lagoon system, thus requiring large conventional lagoons. Whereas some recently introduced lagoon treatments claim to reduce odors, these treatments essentially increase greenhouse gas emissions, such as carbon dioxide and ammonia gas emissions.

In anaerobic lagoons, one of the more common methods of hog manure treatment, organic matter in the waste is decomposed by bacteria. These lagoons are under increased criticism for offensive odor can result from incomplete decomposition and because of possible ground water contamination. Anaerobic lagoons also diminish nutrient value in the hog wastes through processes that include the loss during digestion of much of the nitrogen in the waste. Furthermore, conventional lagoon methods include the retention for long periods of time of big volumes of water that is meanwhile not used for productive purposes. To make these conditions worse, the activities that generate the organic waste that is conventionally treated in lagoons generally have a very high fresh water demand.

Currently, organic waste is largely treated and disposed of by relying on technology developed in the 1940's for small scale operations, and integrated waste systems are nonexistent. In particular, most of the presently available waste treatment and disposal methodology relies on single unit operations which address a single problem or a very reduced number of problems. This approach cannot solve the variety of environmental, economical, operational, and technological problems that the multifaceted waste treatment and fertilizer production industry faces.

Another limitation faced by most conventional waste treatment methods is the inability to effectively treat large amounts of organic waste and produce purified re-usable water. This limitation becomes particularly relevant in a production framework in which large animal operations gain efficiency by raising a very large number of animals in controlled indoor environments which in turn produce enormous amounts of organic waste. See, for example, Warren Cohen, *United States Deep In Manure*, US News & World Report, Jan. 12, 1998, p. 46.

Modern farming operations must address the problems that are inherent to the confining of large numbers of animals in concentrated feeding operations. To this respect, it has been reported that more manure is produced in some areas of the US than can be safely applied to available crop land. See, for example, *National Legislation Needed to Address*

*Animal Waste Pollution, Senate Panel Told*, BNA Environment Reporter, Vol. 28(49) (1998) pp. 2647–49, and Waste From Hog, Chicken Farms Growing at 'Alarming' Rate, Group Says, BNA Environment Reporter, Vol. 28(48) (1998) pp. 2648–50. As noted above, these operations typically consume big volumes of water and they also generate huge volumes of waste water.

Sewage waste water treatment faces some of the same problems and raises similar concerns. Whereas the US has been regarded as a leader in sewage management, and sewage-treatment technology has been described as a success story in 20th-century US, it has been asserted that significant commercial advantages have been significantly lacking in the past few decades. Moreover, existing treatment methods have been characterized as facing a number of inherent problems that must be overcome to make further progress in the next century. William J. Jewell, *Resource-Recovery Wastewater Treatment*, American Scientist, Vol. 82 (1994) pp. 366–75.

Supply is a fundamental issue in fresh water resource management. It has been reported that water will "be a seriously scarce resource in the coming decades as we move from a population of 5 or 6 billion to 10 billion," USA Today, Jun. 5, 1996. This predicted scarcity is in contrast with the seemingly abundant supply of water in our planet, where at least 70% of its surface is covered by water. However, it is reported that only about 2.5% of all the world's water is fresh, fit for human consumption, agriculture and industry. Furthermore, it is estimated that only about 0.3% of the total fresh water is usable for the world's entire human and animal populations. Rising population, urbanization and economic growth have put major constraints on the availability of fresh water.

These concerns for the need and supply of fresh water have been manifested in a recent Report for Congress, which in a relevant part states that "[g]rowing population and changing values are increasing demands on existing water supplies, resulting in water use conflicts throughout the country. These conflicts are particularly evident in the West, where population is expected to increase by 30% in the next 20–25 years and where urban needs often conflict with agricultural needs, as well as with increased demand for water for endangered species, recreation, and scenic enjoyment." Betsy A. Cody and H. Steven Hughes, Congressional Research Service. Report for Congress. RS20569: Water Resource Issues in the 106th Congress, updated Sep. 22, 2000, <http://www.cnie.org/nle/h2o-28.html>, visited Oct. 18, 2000.

Attempts in the industry to overcome the multifarious limitations that are inherent to single unit operations have failed to date because of the inability to implement them economically or because of operational and technical difficulties. This limited scope of the current waste treatment and disposal technology has lead to industry problems that have received intense scrutiny by the media. Therefore, an encompassing, integrated waste treatment system is a long felt, yet unsatisfied, need in agribusiness. The need for an encompassing and integrated waste treatment system has been expressed in a plurality of articles, statements on public health impacts and studies and regulations on animal feeding operations.

The EPA and legislators have been increasingly sensitive to the problems caused by current organic waste disposal practices and they have been focusing on the need to address such problems. In particular, the development of scientifically valid limits on land application of manure has been called, and the EPA has been reported as planning to revise the feedlot effluent limitations guidelines for poultry and swine by 2001, and for beef and dairy cattle by 2002. See *Federal Role in Animal Waste Control Should Be Limited, House Panel Told*, BNA Environment Reporter, Vol. 29(3) (1998) pp. 178–79; *Draft Strategy for Animal Feeding Operations*, EPA Memorandum, Mar. 4, 1998, and *Compliance Assurance Implementation Plan For Concentrated Animal Feeding Operations*, Office of Enforcement and Compliance Assurance, EPA, Mar. 5, 1998.

Acridity problems have also been increasingly addressed by legislators and government agencies. For example, following a recommendation from the Missouri Department of Natural Resources, the State of Missouri Air Conservation Commission reportedly agreed on Feb. 3, 1998, to form a task force to analyze odor pollution issues related to large hog and poultry farms in the state. See *Task Force to Study Odor Issues Relating to Large Hog*, Poultry Farms, in BNA Environment Reporter, Vol 28(40) (1998) p. 2134.

In addition to the focus on the problems that untreated organic waste discharge may cause, government strategies have also highlighted the need for developing new technological approaches for treating organic waste, pointing out in particular that the use of successful and innovative technological approaches should be encouraged and pursued. Draft of the *Strategy for Addressing Environmental and Public Health Impacts From Animal Feeding Operations*, EPA, March 1998, pp. 11–12.

Furthermore, recovery of purified water from the waste generated in organic waste sources for its use in agriculture, farms and livestock operations is a desirable goal because of the increasing fresh water scarcity and the big volume of water needed for such operations.

There is therefore a need in the art for an efficient, simple, economically viable method and system for converting organic waste into useful products such as fertilizers. There is also a need in the art for an efficient, simple, economically viable method and system for recovering purified water from organic waste, so that the purified water can be used in productive practices such as agriculture, farming and livestock operations.

More specifically, there is a need for processes and systems to separate purified water from organic waste so that a high percentage of the water from the organic waste is recovered in the form of fresh water that can be used in farm and agricultural applications, and such that these processes and systems satisfy the following conditions: (a) they are environmentally acceptable; (b) they do not rely on the use of toxic substances; (c) they do not require the incorporation into the process of extraneous substances to accomplish the separation of fresh water, these extraneous substances being exemplified by clathrate-forming substances and refrigerants; (d) they permit the production of low cost fresh water; (e) they do not rely on mechanically separated separation devices such as centrifuges, filters, drum crystallizers and crystallization rollers; (f) they do not rely for the separation of fresh water on power-operated thermal devices such as powered heat exchangers, refrigerators, vacuum freezers, and heaters; (g) they are simple to implement, compatible with and suitable for their incorporation into the organic waste treatment environment of organic waste sources such as hog farms; (h) other than equipment for fluid circulation and fluid flow control, they primarily rely on external climatic conditions and they are suited for their operation under exposed conditions; (i) they do not rely on subsequent treatments such as coagulation and/or filtration for the separation of fresh water, but instead they lead to the direct separation of fresh water upon subjecting the feed waste fluid to suitable freeze-thaw conditions that do not rely on multiple solid-liquid-vapor phase transformations; (j) the waste fluid itself in the processes and systems is separated into fresh water without having to resort to solid atomization, solid-state processing of crystallites of various compositions, freeze drying and/or vaporization; (k) they can easily be automated; they do not rely on land applications of residual waste products, such as waste stream; (m) they are suitable for effectively separating fresh water from complex organic waste fluid that includes setteable and nonsettleable materials such as suspended and dissolved solids, including fine solids of predominantly organic origin, various biomaterials and bio-related materials, various inorganic materials and their complexed and combined forms with the bio and bio-related materials, such materials being present in the complex organic waste in a variety of aggregation and phsyicochemical forms such as solution, suspension, and colloidal forms; (n) they are suitable for directly treating organic waste that has not been subjected to a conventional primary treatment, also known as a conventional lagoon treatment, upon organic waste production in a center such as a hog farm; and (o) they can effectively treat and separate fresh water from the enormous volume of physicochemically complex organic waste generated by large farms, such as hog farms holding a number of animals in a range as high as from 50000 to 100000 or more.

Each of the afore-mentioned elements of related art is hereby incorporated by reference in its entirety for the material disclosed therein.

BRIEF SUMMARY OF THE INVENTION

The present invention has been developed in response to the present state of the art and, in particular, in response to problems and needs that have not been solved heretofore.

Methods and systems according to the present invention permit the separation of valuable substances from organic waste. These valuable substances include purified water and nutrients, such as fertilizers. Organic waste that is treated according to the present invention includes complex forms of waste, such as organic waste that comprises setteable and nonsettleable materials such as suspended and dissolved solids, including fine solids of predominantly organic origin, various biomaterials and bio-related materials, various inorganic materials and their complexed and combined forms with the bio and bio-related materials, such materials being present in the complex organic waste in a variety of aggregation and phsyicochemical forms such as solution, suspension, and colloidal forms.

Implementation of methods and systems according to the present invention includes controlled freeze/thaw processes. Evaporation is also included in some embodiments of the present invention. Embodiments of methods and systems according to the present invention provide a closed processing loop that requires no land application of waste. Waste constituent recovery according to embodiments of the present invention is envisaged to be at least 98%. Recovered constituents include highly soluble components such as potassium, sulfates, chlorides, and soluble organic material. Purified water recovery according to embodiments of the present invention provides up to about 66% of the total fresh water requirements of the farm that generates the organic waste from which the purified water is recovered.

The various controlled freeze/thaw operations according to the present invention include, but are not limited to, operations in a single spray field, and they also include processes that can be implemented in staged operations to increase the separation into purified water and brine fraction in other embodiments. Furthermore, the number of fractions separated in any given spray field according to the present invention includes, but is not limited to, purified water and one brine fraction, and also a number of fractions that comprise purified water and a plurality of brine fractions in other embodiments. Brine is subjected to various separations in staged operations according to the present invention.

Embodiments of the systems and methods according to the present invention permit the separation of purified water and/or nutrient materials from organic waste with low capital and operating costs, with relatively simple methodology that can easily be automated, providing near full recoveries of the valuable materials in the organic waste, eliminating the need for land applications of residual waste products, such as waste stream, and providing for water re-use as fresh water.

These and other objects, features, and advantages of the present invention will become more fully apparent from the following specification and drawings, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Same numbers used in different drawings label like features. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1A:
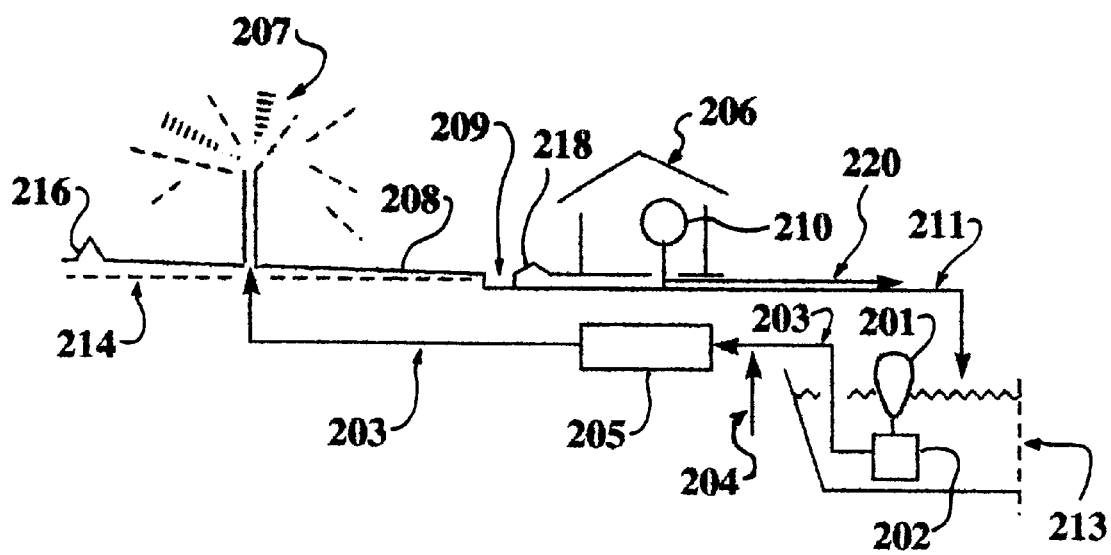
FIG. 1A schematically shows a side view of freeze/thaw cycle elements in an embodiment of a system according to this invention.

The present invention is directed to methods and systems for the separation of components such as purified water and nutrient materials from organic waste. Forms of organic waste envisaged within the scope of the present invention include organic waste such as hog farm waste and organic waste processing effluents. The methods and systems of this invention include operations such as controlled ice formation and thawing. The methods and systems of the present invention are devised to process organic waste that comprises settleable and nonsettleable material. This material includes matter in forms such as suspended and dissolved solids, colloids, and fine solid residue of predominantly organic origin. In addition, some embodiments of the present invention comprise evaporation operations. These operations are implemented preferably for concentration purposes and they can be embodied by passive or active evaporation or a combination of both types of evaporation.

During ice formation, low TDS water is the first fraction to freeze and the last fraction to thaw. According to this principle, the freeze/thaw cycle has been used to separate brackish water into a saline fraction and a purified water fraction. Effluents generated by organic waste sources, however, pose specific problems due to the complexity of their chemical composition and physical form of their constituents. These problems are not exhibited by waste materials, such as brackish water, aquifer water and oil and gas production water, because of their comparatively simpler constitution. The complex organic waste treated according to this invention includes setteable and nonsettleable materials such as suspended and dissolved solids, including fine solids of predominantly organic origin, various biomaterials and bio-related materials, various inorganic materials and their complexed and combined forms with the bio and bio-related materials, such materials being present in the complex organic waste in a variety of aggregation and phsyicochemical forms such as solution, suspension, and colloidal forms. These characteristics of the complex organic waste treated according to the present invention render the separation of purified water and nutrient materials from organic waste a particularly complex problem when its solution is attempted by controlled ice formation and thawing. Aspects of this complex problem include clogging, spray discharge control, staged processing, poor separation, and solid encapsulation. Furthermore, the special and complex chemical and physical characteristics of the fluid organic waste processed according to the methods and systems of this invention distinguish such feed fluid from other feed fluids such as brackish water, river water, aquifer water, oil and natural gas production water, and sea water. The distinguishing features are not merely in the amount or extent of one class of dissolved components, such as salts, but in the nature or kind of the fluid to be processed. Because of at least these special and complex distinguishing characteristics of the fluid organic waste processed according to the present invention, one would not expect that the use of controlled freeze-thaw processes would effectively lead to the separation of fresh water from the feed fluid treated according to this invention, particularly while satisfying conditions such as conditions (a)–(o) set forth hereinabove. In addition, because of at least these special and complex distinguishing characteristics of the fluid organic waste processed according to the present invention, one would not expect that the use of controlled freeze-thaw processes would effectively lead to the separation of fresh water from the feed fluid treated according to this invention with the separation extent characteristics and with the composition characteristics of the separated water according to the present invention.

In addition to hog farm effluents, other effluents that are treated with embodiments of the methods and systems of the present invention include effluents from lagoons used to store and/or treat farm liquid waste, dilute packing house fluids, dairy and feedlot runoff, and waste processing effluents such as the diverse fluid flows encountered at the various stages of processes such as those described in U.S. patent application Ser. No. 09/235,461 filed Jan. 22, 1999, in the name of Larry P. Sower, entitled Methods for Producing Fertilizers and Feed Supplements From Agricultural and Industrial Wastes (hereinafter referred to as "Fertilizer and Feed Supplement Production"), and in U.S. Patent application Ser. No. 09/595,702, filed Jun. 16, 2000, in the name of David Allen Townsend, James H. Freiss, Joel Willis Sneed, Brian Paolsen, and Alfred Stewart, entitled Animal Waste Management System and Method Thereof (hereinafter referred to as "Internal Recycling System"), both of which applications are incorporated herein by reference in their entirety.

The terms "waste processing effluents" refer herein to fluid flows such as those encountered at the various organic waste processing stages. Examples of these processing stages are those in the methods disclosed in Fertilizer and Feed Supplement Production and in Internal Recycling System.

The terms "feed fluid" refer herein to fluid to be processed according to the present invention. When embodiments of the present invention are implemented in conjunction with organic waste treatment processes, such as those described in Fertilizer and Feed Supplement Production, the fertilizer analysis, particularly potassium, is significantly enhanced.

The terms "recycling plant" as used hereinbelow include one or more than one embodiment of organic waste recycling plants, such as those within the scope of Internal Recycling System. The terms "process plant" and "fertilizer plant" as used hereinbelow include one or more than one embodiment of organic waste processing plants and organic waste fertilizer production plants, such as embodiments of these plants within the scope of Fertilizer and Feed Supplement Production. Embodiments of these organic waste processing plants permit the processing of organic waste in a manner such that the treatment process does not rely on conventional primary treatment.

The terms "purified water" describe herein the aqueous medium, whether in liquid or solid form, which is separated in a freeze-thaw cycle as the fraction with the lower concentration of impurities. The term "brine" describes herein a liquid fraction with higher concentration of impurities which is separated in a freeze-thaw cycle. As used herein, the term "brine" refers to a solution with a higher concentration of impurities such as those found in any of the forms of organic waste that is treated according to the methods and systems of the present invention. These impurities are not merely salts and/or suspended solids, but they include setteable and nonsettleable materials such as suspended and dissolved solids, including fine solids of predominantly organic origin, various biomaterials and bio-related materials, various inorganic materials and their complexed and combined forms with the bio and bio-related materials, such materials being present in the complex organic waste in a variety of aggregation and phsyicochemical forms such as solution, suspension, and colloidal forms. Furthermore, terms such as "fraction", "fractionation" and related terms are used herein to refer to the separation of purified water and brine according to the methods of the present invention.

Experiments performed with embodiments of the systems and methods of this invention showed that such impurities including settleable and nonsettleable material were effectively separated from purified water. The separated material included both suspended and dissolved solids and other impurities initially present in the organic waste. As illustrated by the examples provided herein, embodiments of the systems and methods according to the present invention provide a low cost, relatively simple technology to separate fresh water and waste components from complex organic waste in the form of feed fluid.

Embodiments of the systems and methods of the present invention that are applied to the treatment of waste processing effluents are envisaged to produce purified water and brine, while eliminating the needs of ammonia stripping for nitrogen recovery, de-nitrification for ammonia removal, and ultrafiltration to remove remaining solids in water for animal reuse.

Embodiments of the systems and methods of the present invention that are applied to the treatment of waste processing effluents are devised to complete the primary liquid/solids separation from barn effluents, from pull plug and high volume flush waste systems.

Implementation of embodiments of the systems and methods of the present invention led to the production of purified water with a TDS concentration of less than 1000 ppm. Samples of purified water according to this methodology had TDS concentrations as low as about 200 ppm, and suspended solids were minimal. TDS concentrations in purified water according to the present invention can be chosen as required by the end use of the produced purified water, such as according to an irrigation water limit, drinking water limit, and animal farm water limit. These TDS limits typically range from about 200 ppm to about 4000 ppm, and purified water can be obtained according to the present invention with a TDS concentration within this range or even lower. The volume of purified water produced by embodiments of the systems and methods of the present invention depends on the concentration of impurities in the feed fluid waste. The volume of liquid purified water, however, exceeds the volume of brine.

Implementation of embodiments of the systems and methods of the present invention to the treatment of organic waste, such as waste processing effluents, includes suspended solid removal optimization to achieve effective removal even when the effluents contain a large amount of suspended solids; improved spray field discharge control to avoid problems such as clogging; and staged processing.

FIG. 1A schematically shows a side view of freeze/thaw cycle elements in an embodiment of a system according to the present invention. This is an illustrative embodiment in which feed fluid with impurities including settleable and nonsettleable material is taken from lagoon 213 and brine is also discharged into lagoon 213 through return line 211. This source of the feed fluid and destination of the brine, however, are not limiting features of the embodiment schematically depicted in FIG. 1A or of this invention, but they are merely illustrative features. In other embodiments of this invention, feed fluid supplied to spray systems 207 is embodied by other forms of waste, such as waste processing effluents and barn waste fluids.

As shown in FIG. 1A, feed fluid is provided through feed line 203. Flow rate and other characteristics of the feed fluid that circulates along feed line 203 are preferably controlled at control package 205, which preferably includes one or more control elements such as at least one line gate valve, at least one pressure meter, at least one sample port, at least one flow meter, and at least one flow meter recording device. Control package 205 includes in other embodiments of this invention devices such as at least one refractometer, and at least one instrument for measuring amount and size of suspended solids.

In the embodiment schematically depicted in FIG. 1A, feed fluid of appropriate physical characteristics circulates in feed line 203 at a suitable pressure.

Appropriate physical characteristics include a suitable size of material such as suspended solids. Material characteristics such as suitable particle size and flow characteristics such as suitable pressure are provided in the embodiment schematically depicted in FIG. 1A by submersible grinder-pump 202 whose position is preferably regulated by buoy 201. When a grinder-pump device is used in embodiments of this invention, this device is preferably provided with a temperature controlled switch, so that the device can be switched on and off manually or automatically at pre-set temperatures.

Spray flow in preferred embodiments of this invention is maintained so that a brine fraction flow is maintained. This flowing brine carries away solids and other impurities that would otherwise be encapsulated or encased in the ice. To this effect, spray flow is regulated in some embodiments depending on the ambient conditions, such as temperature, so that the spray flow is increased as the temperature decreases for the same impurity concentration in the feed fluid. Spray flow is regulated in other embodiments according to the fluid brine flow obtained from the spray pad, so that at least a desired fluid brine flow is obtained from the spray pad. Other embodiments of this invention combine spray flow regulation as a function of ambient conditions, such as temperature, and as a function of fluid brine flow obtained from the spray pad. Spray flow regulation in these embodiments is preferably accomplished with the use of at least one of an ambient condition sensor device, such as a temperature sensor, coupled with a flow control device that is regulated according to pre-set variations of the monitored condition; and a fluid brine flow sensor device coupled with a flow control device that is regulated according to pre-set variations of the monitored brine flow.

As indicated above, the feed fluid provided by feed line 203 comes in some embodiments of this invention from sources other than or in addition to lagoon 213. Accordingly, FIG. 1A shows alternative feed line 204 that is devised to provide some other form of feed fluid waste according to this invention. For example, in some embodiments, alternative feed line 204 provides waste processing effluents. It is understood that feed line 203 and alternative feed line 204 are preferably provided with suitable flow control valves.

As shown in FIG. 1A, feed line 203 delivers feed fluid to spray system 207. As an illustrative example, FIG. 1A shows only one spray system element, but it is understood that the number of spray system elements is not a limiting feature of the embodiment shown in FIG. 1A or of this invention, and the number of spray system elements in other embodiments of this invention is greater than one.

The feed fluid is sprayed by spray system 207 on spray pad 208. Under suitable ambient conditions, sprayed feed fluid forms solid purified water and liquid brine that predominantly accumulate on spray pad 208. These suitable ambient conditions include temperature and pressure conditions for water freezing. To facilitate the separation of purified water and brine, spray pad 208 is preferably inclined with respect to a horizontal plane 214 so that the liquid brine does not become stagnant. This configuration of spray pad 208 facilitates brine flow towards the bottom of spray pad 208, where it is preferably collected at discharge sump 209. This configuration of the spray pad favors the flow of liquid brine and thus contributes to the prevention of encapsulation of solids and other impurites in the solid purified water fraction.

Prevention of solid encapsulation in purified water ice and in slurry of purified water ice is one of the problems that is addressed and solved by embodiments of this invention. As indicated above, it has been found in experiments performed with embodiments of the present invention that regulation of feed fluid flow to spray system 207 strongly influences the separation of purified water from brine with impurities including settleable and nonsettleable material. Feed fluid flow is preferably regulated so that brine fluid flow on spray pad 208 is maintained and stagnant flow conditions are preferably avoided. These preferred flow conditions lead to an effective separation of impurities including suspended solids from the feed fluid. Consequently, purified water is segregated from brine that contains impurities such as settleable and nonsettleable material. In addition, these preferred flow conditions effectively reduce or even eliminate the possibility that suspended solids in the sprayed fluid become encased or encapsulated in solid purified water that is deposited on spray pad 208. Accordingly, it was found in the context of this invention that separation of fine suspended solids occurs as a function of fluid flow over spray pad 208, and it was found that suspended solids can effectively be maintained in the brine fraction through a combination of preferably continuous low volume flow over a spray pad and the tendency of the remaining suspended solids to be removed during the initial thaw period from porous (mush) ice that is formed by high TDS concentration feed fluids.

Some embodiments of this invention include barriers 216 and 218, or equivalent features, that are designed to minimize the risk of run off from spray pad 208. Spray pad 208 is preferably designed so that leaks of brine through the spray pad are minimized or even eliminated. For example, some embodiments of this invention are provided with a lined spray pad 208.

Liquid purified water is preferably recovered in embodiments of this invention upon thawing of the solid purified water accumulated on spray pad 208. Thawing is achieved as a consequence of exposure to suitable ambient conditions. It may also be achieved by supplying heat to spray pad 208 with a system of heating elements (not shown in FIG. 1A), or by relying on a combination of suitable ambient and artificial heating conditions.

Fluid flow collected at discharge sump 209 is subsequently directed according to its composition. Accordingly, the brine fraction is directed to suitable disposal or, as shown in FIG. 1A, back to lagoon 213 along return line 211. The liquid purified water fraction is directed through recovery line 220 to a re-use facility, such as a water storage tank for agricultural or livestock operations. In other embodiments of this invention that rely on multi-stage operation, recovery line 220 directs the liquid purified water fraction to a subsequent separation unit and/or the brine fraction is directed to a subsequent separation unit. Recovery line 220 is preferably embodied by a heat traced line so that the freezing of the liquid purified water circulating therein can be prevented. Furthermore, discharge sump 209 is also preferably heat traced so that the freezing of the liquid purified water accumulated and circulating therein can be prevented.

Fluid flow is preferably automatically directed to recovery line 220 or to return line 211. To this effect, embodiments of this invention preferably include discharge instrumentation package 210 that preferably comprises one or several devices such as at least one sample port, at least one conductivity meter, at least one flow meter, at least one recording instrument, and at least one conductivity-regulated valve to direct fluid flow through return line 211 or through recovery line 220 depending on a pre-set conductivity value.

Conductivity measurements are devised to identify the fluid flow from discharge sump 209 as purified water flow or as brine flow. Two fractions are further identified in the brine flow obtained in some embodiments of this invention. These fractions are referred to as brine, the fraction with the highest TDS concentration, and recycle, the fraction with an intermediate TDS concentration that is preferably redirected for additional fractionation. Conductivity measurements are preferred for monitoring the compositional characteristics of the fluid flow from discharge sump 209. It is understood that this type of measurements can be supplemented or replaced in other embodiments of this invention by other qualitative and/or quantitative analytic techniques, such as refractometry measurements with a refractometer.

The collection of brine and purified water from spray pad 208 is preferably, although not exclusively, achieved as disclosed hereinabove. For example, other embodiments of the present invention include a pivoting or an oscillating spray pad that is provided with variable inclination and slope depending on whether the fluid to be collected is brine or purified water. It is understood that such embodiments with other ways of collecting material from a spray pad are envisaged within the scope of the present invention.

The devices in control package 205 and/or discharge instrumentation package 210 are preferably sheltered from the elements and this can be accomplished, for example, by having them in shed 206 that is preferably provided with an air conditioning control system. In addition, embodiments of the present invention are provided with an on-site weather station (not shown in FIG. 1A) for determining local weather conditions. In preferred embodiments, the weather monitoring instruments in this weather station are interconnected with devices in control package 205, and/or discharge instrumentation package 210, and/or grinder-pump 202 through processing equipment that is known in the art. This interconnection facilitates a high degree of automation in operating embodiments of the present invention.

Figure 1B:
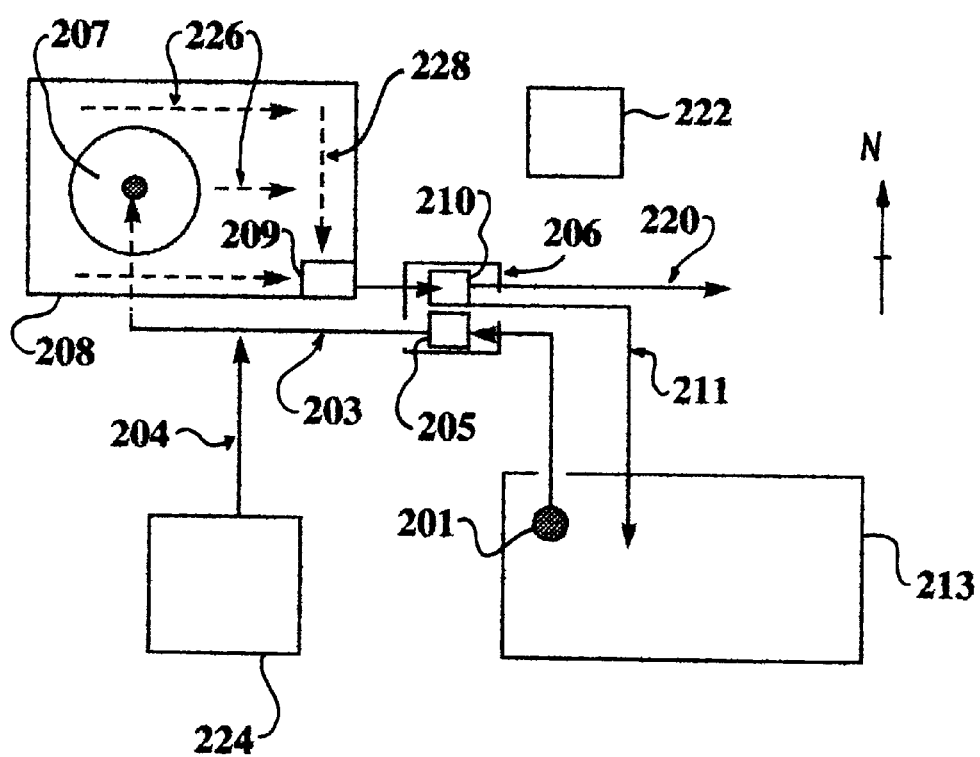
FIG. 1B schematically shows a top view of freeze/thaw cycle elements in an embodiment of a system according to this invention.

FIG. 1B schematically shows a top view of an embodiment whose side view is depicted schematically in FIG. A. In addition to the features shown in FIG. 1A, FIG. 1B shows weather station 222, source 224 of additional feed fluid, such as a barn or a source of waste processing effluents, and flow lines 226 and 228.

Flow lines 226 are oriented according to the inclination of spray pad 208, and flow line 228 is oriented according to the inclination of the feature that directs the fluid flow to discharge sump 209. Spray pad 208 in preferred embodiments of this invention is oriented so that its gradient from high to low is oriented easterly. Arrays of spray elements are preferably oriented so that they define a longitudinal axis that is generally perpendicular to the north-south direction.

Figure 2:
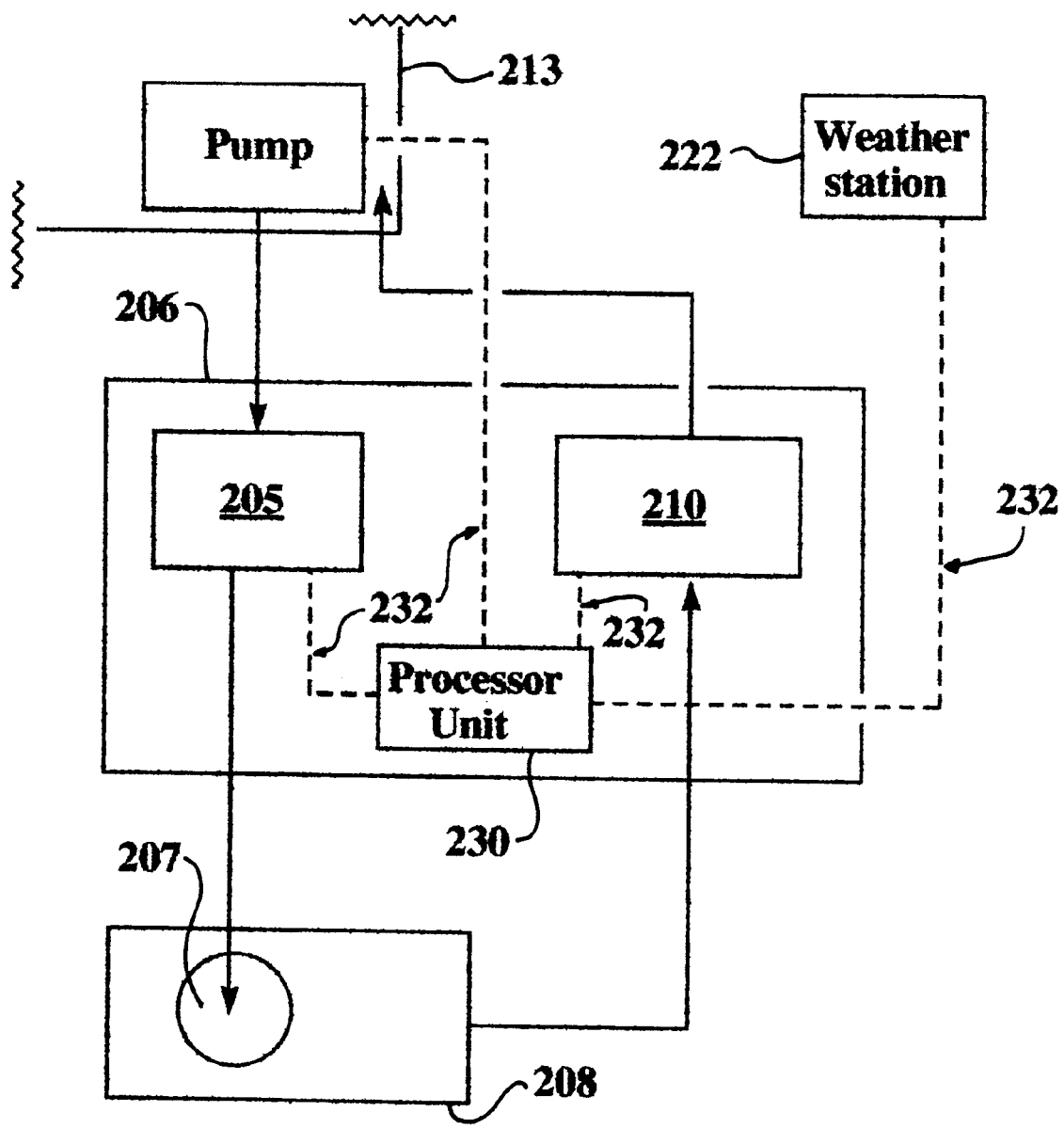
FIG. 2 schematically shows a flow chart for an embodiment of a system and process according to this invention that includes elements such as those displayed in FIGS. 1A–1B.

Operational features of embodiments that include elements schematically shown in FIGS. 1A–1B are depicted in the flow chart shown in FIG. 2. In addition to features shown in FIGS. 1A–1B, FIG. 2 displays processor unit 230 with recorder and/or controller capabilities. Connection lines 232 represent a plurality of optional connections among elements such as those shown in FIGS. 1A–1B. Processor unit 230 is preferably devised to control the operation of such elements, and/or record performance features of such elements, and/or record features, such as compositional, physical and flow features, of the different fluids referred to in the foregoing discussion of the illustrative embodiments represented in FIGS. 1A–1B.

The illustrative embodiments schematically shown in FIGS. 1A–1B and 2 comprise one spray pad and one spray system. These features are, however, not limiting but only illustrative aspects of the present invention as implemented in some of its embodiments. Other embodiments of the present invention comprise more than one spray pad and/or more than one spray system. Furthermore, other embodiments of the present invention operate according to a multi-stage process in which purified water is eventually obtained after having been treated in more than one freeze/thaw stage. Multi-stage operations, also referred to as "staging", increase the amount of recovered purified water and decrease the volume of fluid brine collected, which is typically more concentrated than the brine that would otherwise be obtained without staging. In one embodiment of a two-stage operation, for example, a volume of purified water in the range from about 60% to about 70% of the feed fluid was recovered in the first stage, which also separated a volume of brine in the range from about 30% to about 40% of the feed fluid. The total volume of purified water recovered in the two stages combined of this illustrative embodiment was in the range from about 80% to about 90% of the feed fluid and the total volume of separated brine was in the range from about 10% to about 20% of the feed fluid. Additional illustrative examples provided hereinbelow comprise a plurality of spray pads and/or a plurality of spray systems and/or a plurality of freeze/thaw stages.

Embodiments such as those schematically shown in FIGS. 1A–1B and 2 can be part of a pilot plant design, in which case the constitutive elements are preferably characterized by parameters such as those given as follows. Feed line 203 is preferably an approximately two-inch line. Spray system 207 is preferably provided with a Cx 10 spray nozzle that ejects a fluid flow at about 10 gpm (the term "gpm" is hereinafter used as a short form of "gallons per minute") from about 5 ft above the spray pad, within a spray diameter of about 26 ft, projecting at a spray height of about 7 ft, and operating at a feed pressure of about 7 psi. In preferred embodiments, the spray nozzles are hollow core spray nozzles, but other nozzles can be used in other embodiments of the present invention. The choice of these nozzles is preferably based in part on adequately balancing the heat transfer properties of the material ejected from the nozzle with the drift characteristics of the same material. For example, finer sprayed material will be more suitable for extensive heat transfer, a property that favors ice formation, but at the same time it will drift considerably, and thus part of the sprayed material might be blown outside the spray pad. Spray pad 208 is preferably an about 60 ft by about 80 ft pad. These dimensions are preferably based in part on the characteristics of the spray system, and should be chosen so that the sprayed material is substantially collected on the spray pad. The slope of spray pad 208 is in these embodiments preferably such that a length of about 80 ft leads to a vertical gain of approximately 4 in. Furthermore, spray pad 208 comprises in some embodiments a lined 40 mil high density polyethylene (HDPE) liner. Recovery line 220 and return line 211 are preferably about four-inch lines. A submersible grinder-pump Grainger IN2 16 pumping up to 40 gpm of fluid is an illustrative example of an embodiment of grinder pump 202. As indicated above, these characteristics of individual elements of the embodiments schematically depicted in FIGS. 1A–1B and 2 are illustrative of the implementation of such embodiments as part of a pilot plant. These embodiments, however, can be implemented as part of a treatment plant, in which case the parameters given above can be appropriately scaled. For example, each spray nozzle in a treatment plant can eject about 50 gpm. Scaling of the additional parameters given above can be accomplished with the additional examples provided hereinbelow and ordinary skill in the art.

Figure 3:
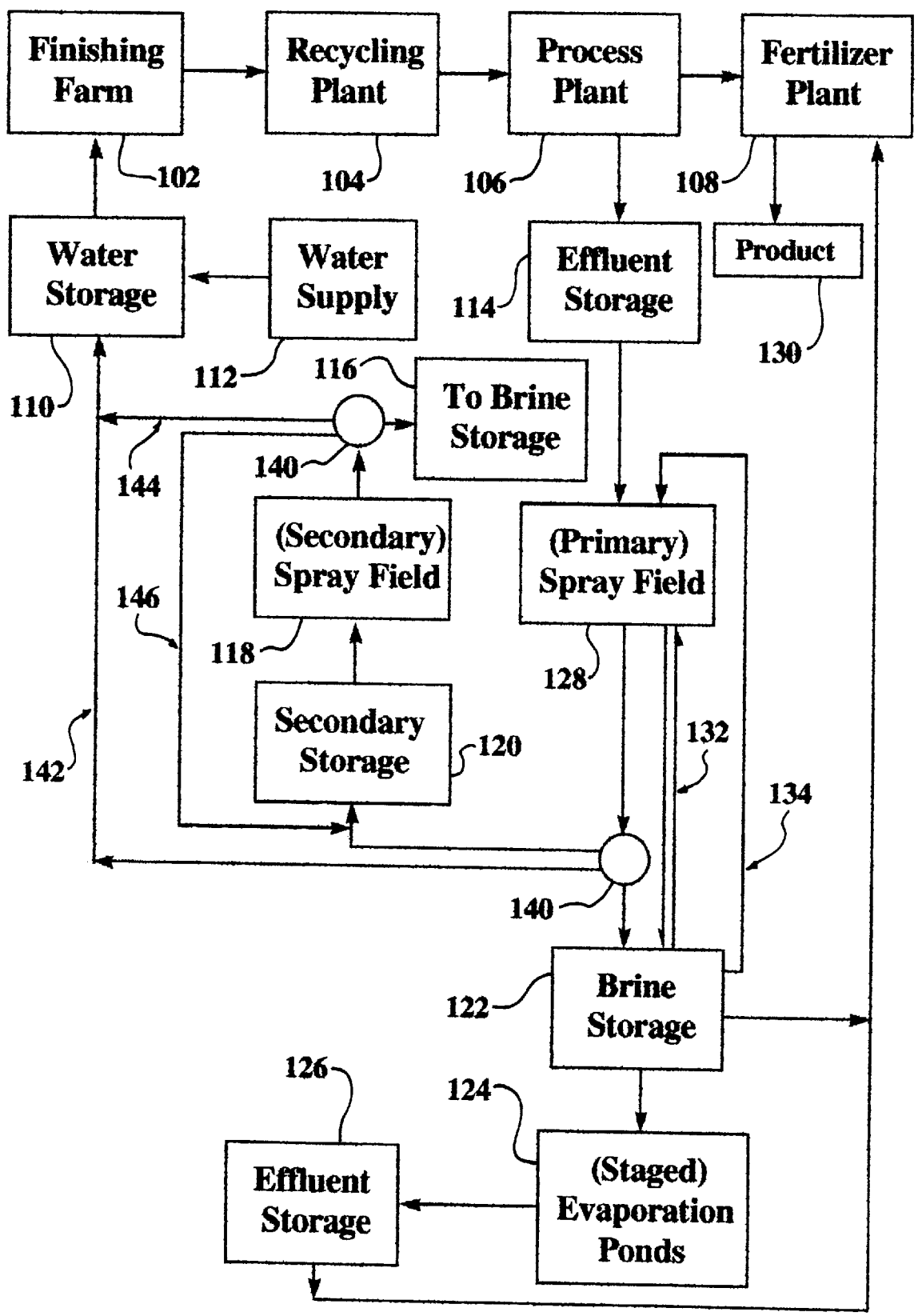
FIG. 3 schematically shows a flow chart for an embodiment of a system and process according to this invention.

FIG. 3 schematically depicts a flow chart for an embodiment of the systems and processes of this invention. This flow chart is first discussed in terms of its qualitative characteristics, and it is discussed subsequently in terms of quantitative and more specific parameter and design characteristics that are given as examples. Having provided parameter and design characteristics for embodiments of the present invention that are implemented as part of a pilot plant, the parameter and design characteristics given hereinbelow with respect to FIG. 3 refer to a treatment plant. It is understood that these parameter and design characteristics are meant to be illustrative and that they are not provided by way of limitations.

As shown in FIG. 3, organic waste generated at an organic waste source such as finishing farm 102 is treated according to controlled freeze-thaw operations which in this embodiment of the present invention comprise two spray fields, primary spray field 128 and secondary spray field 118. The operation of secondary spray field 118 (or of any other additional spray field not shown in FIG. 3) is optional. Accordingly, a plurality of spray fields can be operated in multi-stage operations, or only one spray field can be operated depending on considerations such as the degree of water purification and the volume of effluent to be treated.

Organic waste generated at finishing farm 102 forms an effluent that is to be treated to separate valuable constituents such as purified water. In some embodiments of the present invention, the organic waste generated at an organic waste source, such as finishing farm 102, is preferably treated at one or more than one facility to extract other valuable components prior to the controlled freeze/thaw treatment. For example, FIG. 3 shows that the organic waste is initially treated at recycling plant 104 and process plant 106 to produce a fertilizer feed that is converted at fertilizer plant 108 into fertilizer product 130, and to produce waste processing effluents that are to be subsequently treated by controlled freeze/thaw operations. These waste processing effluents are optionally directed to effluent storage 114. This operation is preferred when the flow of waste processing effluents is intermittent and/or when the freeze/thaw operations are to be coordinated with the existence of favorable ambient conditions. Effluent from storage 114 is supplied as feed fluid to and treated in primary spray field 128. This treatment preferably takes place when ambient conditions favor freezing of purified water.

The feed fluid is separated in primary spray field 128 into purified water and brine. This purified water is re-used or it is subjected to additional treatment when needed. Additional treatment is preferably provided in another spray field, such as secondary spray field 118, optionally through secondary storage 120. Re-use of purified water obtained from primary spray field 128 and/or secondary spray field 118 can be implemented in a plurality of applications, such as re-use in finishing farm 102, optionally through water storage 110 that can be supplemented with water supply 112 from another source.

At existing farms, lagoons can be converted as water storage 110, and/or effluent storage 114, and/or brine storage 122 in some embodiments of the present invention, but other forms of storage can also be used. Flow from the spray fields, such as primary spray field 128 and secondary spray field 118, is preferably regulated by multi-way flow control system 140. For example, multi-way flow control system 140 is embodied by a three-way valve whose operation is controlled by a conductivity meter.

As indicated by the flow lines in FIG. 3 that are directed from and to primary spray field 128 and secondary spray field 118, purified water can be re-used after feed fluid treatment in a spray field (flow line 142), and in other embodiments it can be re-used after treatment in a plurality of spray fields (flow line 144). Furthermore, brine can be subjected to multiple controlled freeze/thaw operations in any one of the spray fields present in embodiments of this invention, as independently indicated by flow lines 134 and 146.

The schematic flow chart shown in FIG. 3 illustrates another feature of the present invention. This feature is that the spray fields can be used for controlled freeze/thaw operations and also for evaporation operations. These evaporation operations lead to the concentration of the sprayed fluid. Accordingly, the spray systems, such as for example spray system 207, are used in some embodiments of the present invention to concentrate brine solution. This operation leads to more concentrated brine and, as the brine concentration increases, the storage load is reduced and the amount of nutrients to be obtained from such brine is also concentrated. The use of an spray field for concentration purposes according to this invention is illustrated in FIG. 3 by double arrows 132 which indicate that brine from brine storage 122 is pumped and sprayed in primary spray field 128 for evaporation and concentration and returned in more concentrated form to storage 122.

In addition to spray on spray fields for concentration by evaporation, brine is also concentrated in other embodiments of this invention in one or in a plurality of evaporation ponds 124. In a preferred embodiment of this invention, these evaporation ponds are staged evaporation ponds. Concentrated brine from storage 122 and/or from evaporation ponds 124, optionally through concentrated brine storage 126, is preferably directed to fertilizer plant 108 for the subsequent extraction of nutrient materials and conversion into fertilizer.

Preferred parameter and design characteristics for an illustrative embodiment schematically depicted in FIG. 3 are given below with reference to an 80,000-head finishing farm Recycling plant in this embodiment preferably comprises ten units and produces about 150 gpm (or about 242 af/yr) of fluid that is subsequently and preferably treated in process plant 106. The term "af/yr" is used herein to refer to a volumetric flow rate measured in acre-foot per year, and the term "af" is used herein to refer to "acre-foot". Process plant 106 produces about 201 af/yr with about 1.5% TS of waste processing effluents. The term "TS" is used herein to refer to "total solids", and concentrations given herein as percentages are meant to refer to mass unless otherwise indicated. In addition, process plant 106 produces about 41 af/yr of material that is subsequently treated in fertilizer plant 108 for the production of fertilizer. Analysis of characteristics such as total solids and turbidity is performed according to standard methodology in the art.

Waste processing effluents generated at process plant 106 are preferably pre-treated prior to their storage in effluent storage 114. This pre-treatment preferably comprises the addition of an acid to lower the effluent pH to a value of about 7. This treatment minimizes emission loss of volatile substances such as ammonia and/or it maximizes fertilizer yield.

Effluent storage 114 is preferably designed to store about 200 af of waste processing effluents. In terms of effluent production time, effluent storage 114 is preferably designed to hold waste processing effluent that is produced in about one year.

Effluent from storage 114 is preferably pumped into spray field 128 to subject it to controlled freeze/thaw operations at a rate of about 1000 gpm for about 1000 h/year. As it will be discussed below, controlled freeze/thaw operations can be run under favorable ambient conditions for over 1000 h/year in some areas.

Primary spray field 128 is preferably embodied by a 10-acre field. Purified water with preferably not more than about 2000 ppm TDS is directed to water storage 110, a fluid fraction with from about 2000 ppm to about 20,000 ppm TDS is preferably directed to secondary spray field 118, and brine with over 20,000 ppm TDS is directed to brine storage 122. These TDS concentrations are approximate cut-off values. It is understood that embodiments of this invention that operate according to these cut-off valves will usually produce fractions with average TDS concentration within the respective cut-off values. For example, in some embodiments of this invention purified water that is separated according to the criterion of not having a TDS concentration of more than about 2000 ppm, has an average TDS concentration of about 1000 ppm. Effluent, water and brine storage, including secondary storage 120, are preferably provided as units with capacity for about 100 af each.

Secondary spray field 118 is preferably embodied by a 5-acre field. Purified water from this field is directed to water storage 110 which receives about 150 af/yr of purified water from primary spray field 128 and/or secondary spray field 118.

Evaporation ponds 124 are preferably embodied by staged ponds providing an evaporation surface of about 10 acres. These ponds are preferably shallow. Evaporation in these ponds can be supplemented with sprays, leading to an evaporation of about 30 af/yr. Concentration by evaporation is preferably implemented in embodiments of this invention in which brine concentration is to be brought to a preferred level for processing in a process plant and/or a fertilizer plant.

Concentrated brine that is directed to fertilizer plant 108 at a rate of about 20 af/yr has a concentration of about 15% TS. Finally, drier stack loss at fertilizer plant 108 is about 60 af/yr. Brine fed to fertilizer plant 108 is used to augment the fertilizer production process, and moisture fed to the plant is evaporated in the product drier. The terms "drier stack loss" refer to this evaporative loss.

Figure 4:
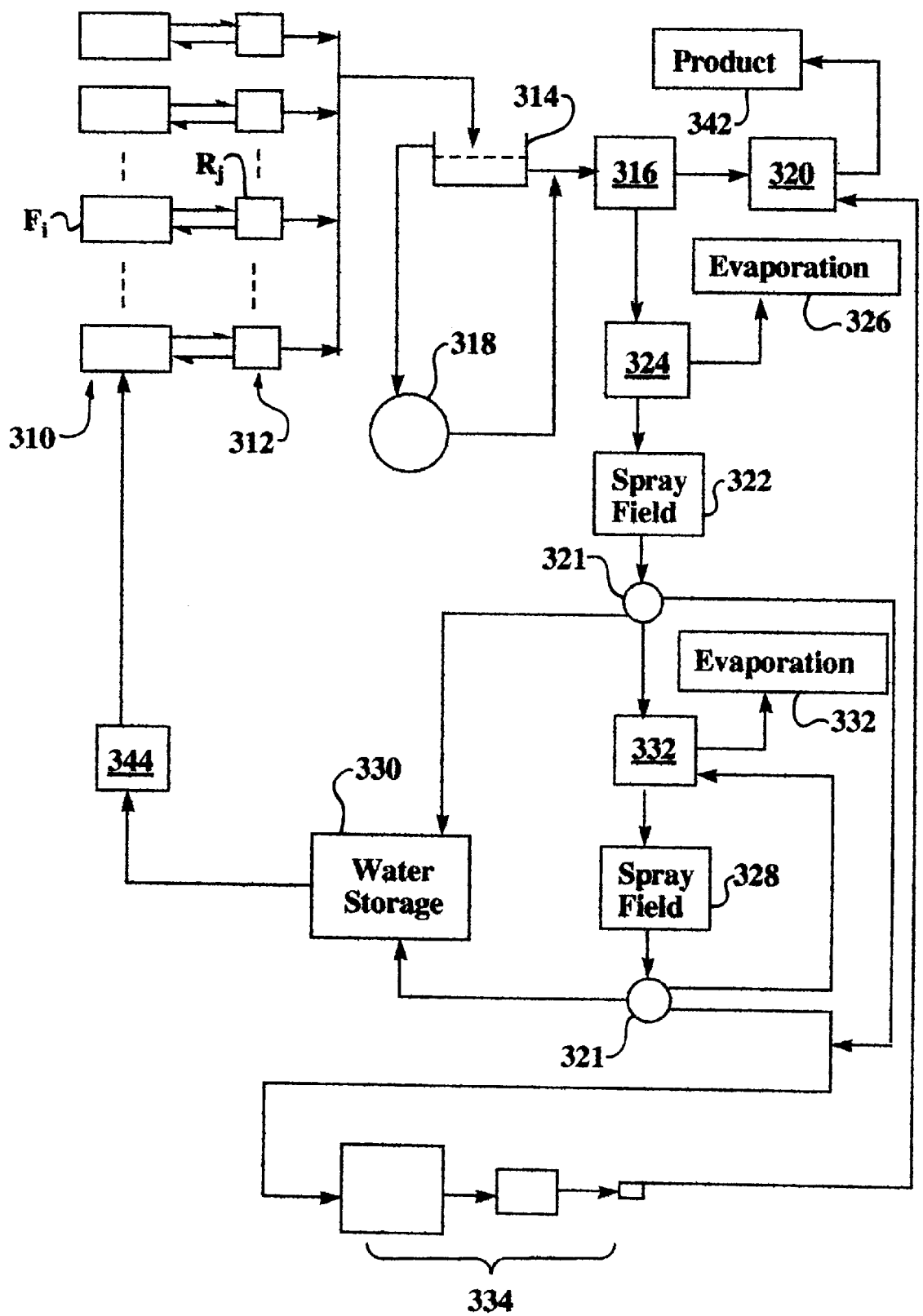
FIG. 4 schematically shows a flow chart for another embodiment of a system and process according to this invention.

FIG. 4 schematically shows a flow chart for another embodiment of the systems and processes according to the present invention.

In this embodiment, organic waste from farm complex 310 is preferably treated in recycling plant 312 to produce waste processing effluents. These effluents are separated into a solid component and a fluid component. Separation is preferably achieved in wet sieve 314. The solid component is directed to process plant 316 and the fluid component is preferably treated in digestor 318.

Gas is separated in digestor 318 from sludge. The gas obtained in digestor 318 is used in applications such as electricity generation and heating, and is preferably consumed at fertilizer plant 320. Sludge from digestor 318 is directed to process plant 316 which generates a cake product, and waste processing effluent to be provided as feed fluid to spray field 322. The cake product is typically obtained from centrifugation and it is to be further treated at fertilizer plant 320.

The pH of the waste processing effluent from process plant 316 is preferably controlled and brought to a value of about 7. This pH control is preferably achieved by addition of sulfuric acid, and this operation is preferably performed automatically with a pH-meter and a pH-meter-controlled supply of acid. This operation produces pH-controlled feed fluid.

Waste processing effluent from process plant 316 is, in some embodiments of this invention, predominantly thickener overflow. Preferably after its pH has been brought to a value of about 7, this waste processing effluent is stored in some embodiments of this invention in one or more than one holding pond(s) 324. This storage is optional, but preferred embodiments of this invention incorporate holding pond(s) 324 to more advantageously use seasonal ambient conditions. For example, storage for approximately one-year in holding pond(s) 324 permits the concentration of the waste processing effluent by evaporation 326 and/or supplementation with evaporation operations in spray field 322 during summer months and separation by controlled freeze/thaw operations in spray field 322 during cold weather periods.

As indicated above, a stage operation with a plurality of spray fields is part of some embodiments of this invention. For example, the embodiment schematically shown in FIG. 4 preferably includes spray fields 322 and 328, even though the operation of both spray fields is not required in the treatment of all feed fluids. When the operation of one of the spray fields, for example spray field 322, produces satisfactory separation into brine and purified water, subsequent treatment at a second spray field is preferably avoided.

As described with respect to the embodiment schematically illustrated in FIG. 3, flow from spray fields 322 and 328 is preferably regulated by multi-way flow control system 321. A three-way valve whose operation is controlled by a conductivity meter is an example of an embodiment of multi-way flow control system 321.

Fractions separated at spray field 322 are preferably directed according to a plurality of the following paths. The purified water fraction with a TDS concentration that is below a pre-set limit is directed to a water re-use facility. Optionally, this purified water flow is directed to water storage 330 prior to its re-use. A brine fraction whose TDS concentration is within a pre-set range is preferably directed to subsequent treatment at spray field 328. Optionally, this brine fraction is directed to holding pond(s) 332, from which the feed fluid flow is regulated according to operational needs and ambient conditions. Another brine fraction with a TDS concentration above a pre-set value is preferably directed to one or a plurality of evaporation ponds 334, which are preferably embodied by staged ponds.

In embodiments that incorporate the use of spray field 328, feed fluid from holding pond(s) 332 is directed to spray field 328. As described with respect to the operation of spray field 322, fractions separated at spray field 328 are preferably directed according to a plurality of the following paths. The purified water fraction with a TDS concentration that is below a pre-set limit is directed to a water re-use facility. Optionally, this purified water flow is directed to water storage 330 prior to its re-use. A brine fraction whose TDS concentration is within a pre-set range is preferably directed to holding pond(s) 332 for subsequent treatment. Another brine fraction with a TDS concentration above a pre-set value is preferably directed to one or a plurality of evaporation ponds 334.

Brine in holding pond(s) 332 in some embodiments of this invention is concentrated in shallow evaporation ponds designed to enhance seasonal evaporation. As used herein, "evaporation" refers to passive evaporation in evaporation containers and/or active evaporation with the assistance of devices such as spray systems according to this invention. Concentrated brine from evaporation ponds 334 is preferably directed to fertilizer plant 320 for the conversion of the nutrients in the concentrated brine into fertilizer product 342.

Purified water which is preferably held in water storage 330 is supplied as fresh water to suitable applications, which include farm complex 310. This supply of fresh water can be supplemented with fresh water from an additional supply, and the fresh water supply can optionally be subjected to additional treatment 344 according to specific needs of particular applications. For example, when farm complex 310 houses hogs, additional treatment 344 can include the incorporation of substances such as disinfectants.

Having discussed qualitative characteristics of embodiments schematically depicted in FIG. 4, quantitative and more specific illustrative parameter and design characteristics for the same embodiments are disclosed below. As indicated with respect to the embodiments schematically shown in the foregoing figures, it is understood that these parameter and design characteristics are meant to be illustrative and they are not provided by way of limitations.

In one embodiment of the present invention, farm complex 310 comprises a plurality of farms $F_i$, where the subscript i labels individual farms and $1 \leq i \leq n$. As an example, n=10, and each farm $F_i$ houses 8000 hogs, so that farm complex 310 in this example houses 80,000 hogs. In this specific example, each farm $F_i$ is provided with a recycling plant $R_j$, where the subscript j labels individual recycling plants and $1 \leq j \leq m$. For the sake of simplicity, m=10 and j=i, which means that each individual farm has its own recycling plant. This illustrative relationship between farms and recycling plants is not a limitation of the present invention, but merely a specific illustrative embodiment. Other embodiments comprise farm units and recycling plant units in different numbers, housing different head numbers, an operating according to a different ratio. For example, in another embodiment of this invention, a single recycling plant is associated with a plurality of farm units.

A hog farm complex having about 80,000 head in ten farm units with about 8,000 head each and ten recycling plants produces about 150 gpm of waste processing effluent with a concentration of about 7% TS. These characteristics imply that about 242 af/yr of effluent are generated and supplied to wet sieve 314, providing about 23,700 tpy dry TS. The term "tpy" as used herein means "English ton per year". Waste processing effluents with these approximate characteristics contain about 2100 tpy of nitrogen as N, about 1700 tpy of potassium as $K_2O$, and about 1700 tpy of phosphorous as $P_2O_5$. Under these conditions, wet sieve 314 produces about 19,000 tpy as dry material that is supplied to process plant 316, and about 4740 tpy as dry material of effluent with about 20% TS that is supplied to digestor 318. About 2400 tpy as dry material of sludge from digestor 318 are supplied to process plant 316, and gas to generate about 3,000,000 Btu/h is obtained from digestor 318 and used in suitable applications, such as the production of fertilizer product in fertilizer plant 320.

Digestor 318 is used in some embodiments of this invention to treat other waste material in addition to material from wet sieve 314. For example, waste from one or more drier(s) used in the preparation of fertilizer product in fertilizer plant 320 is also treated in digestor 318 in other embodiments of this invention.

Process plant 316 is provided under the operating conditions of this illustrative embodiment with about 3500 tpy CaO, magnesium soluble salts, much as epsomite at about 1800 tpy, and about 500 tpy $H_2O$. Process plant 316 generates about 80,000 tpy with about 30% TS of cake product at a rate of about 41 af/yr that is supplied to fertilizer plant 320. In terms of dry product, this is about 24,000 tpy.

The fluid produced in process plant 316 is preferably treated with an acid to adjust its pH to a value of about 7. Sulfuric acid is preferably used to this treatment, in which case the pH adjustment process in this embodiment consumes about 500 tpy of sulfuric acid, preferably industrial grade sulfuric acid. As indicated above, the fluid produced in process plant 316 that is to be treated in spray field 322 is in most embodiments of this invention preferably thickener overflow, which typically contains about 1.5% TS, usually about 50% of this amount of TS is in the form of suspended solids and about 50% in the form of dissolved solids.

Preferred embodiments of this invention comprise holding pond(s) 324, which are preferably embodied by a containment facility that provides a storage capacity of about 200 af/yr. For example, this containment facility is embodied by two 5 acre×20 ft deep ponds. More generally, this containment facility preferably provides storage capacity for the fluid generated during about one year at process plant 316. As indicated above, the fluid stored in holding pond(s) 324 is concentrated in some embodiments under favorable seasonal ambient conditions in evaporation operation 326. Although evaporation rate depends on specific climatological conditions, about 20 af/yr of liquid is evaporated under suitable conditions. This evaporation is achieved preferably by passive evaporation in ponds or similar containers, but evaporation is also achieved in other embodiments of this invention with spray systems, alone or supplementing evaporation ponds.

Feed fluid provided to spray field 322 provides under the conditions of this embodiment about 100 af/yr of purified water whose TDS concentration is not above about 1000 ppm Spray field 328 provides under these conditions about 40 af/yr of purified water whose TDS concentration is similarly not above about 1000 ppm. Depending on specific operating conditions, farm complex 310 may need additional fresh water supply when it is embodied by an 80,000 hog finishing farm, in which case additional fresh water is provided to supplement the purified water separated according to the present invention. This additional freshwater supply ranges from about 50 af/yr to about 120 af/yr depending upon, for example, specific weather conditions that might reduce or increase the hogs' needs for fresh water.

As discussed above with respect to holding pond(s) 324, holding pond(s) 332 are preferably embodied by a containment facility that provides a storage capacity of about 100 af/yr. For example, this containment facility is embodied by a 5 acre×20' deep pond. More generally, this containment facility preferably provides storage capacity for brine of intermediate TDS concentration generated during about one year at spray field 322. As indicated with respect to embodiments schematically shown in FIG. 3, this intermediate TDS concentration preferably ranges from about 2000 to about 20,000 ppm TDS as cut-off values. Brine whose TDS concentration is greater than about 20,000 ppm is preferably directed to evaporation ponds 334. The fluid stored in holding pond(s) 332 is concentrated in some embodiments of this invention under favorable seasonal ambient conditions in evaporation operation 340. As indicated above with respect to evaporation operation 326, evaporation rate depends on specific climatological conditions, but about 20 af/yr of liquid is evaporated under suitable conditions in evaporation operation 340.

As shown in FIG. 4, feed fluid from holding pond(s) 332 is fractioned in spray field 328 to obtain preferably three fractions comprising purified water, a fraction with an intermediate TDS concentration that is preferably directed back to holding pond(s) 332, and a high TDS concentration fraction that is preferably directed to evaporation ponds 334.

It is understood that the TDS concentration ranges given above with respect to embodiments schematically show in FIG. 3 are preferred ranges, but fluid flow control of the material fractioned in any spray field according to this invention can be effectuated according to other pre-set concentration limits. Furthermore, pre-set concentration limits are replaced by pre-set limits for some other physical or chemical property in other embodiments of the present invention. In still other embodiments of the present invention, pre-set concentration limits are supplemented by pre-set limits for some other physical or chemical property to effectuate the fluid flow control of the material fractioned in any spray field according to this invention.

Concentrated brine in embodiments schematically shown in FIG. 4 is directed to evaporation ponds 334 at a rate of about 20 af/yr. In preferred embodiments of this invention, evaporation ponds 334 comprise staged storage ponds that offer about 5 acres of total surface area. Brine is preferably evacuated from these evaporation ponds where the TS concentration reaches about 15% and it is directed to fertilizer plant 320 at a rate of about 8 gpm.

Fertilizer product produced at fertilizer plant 320 contains nitrogen-based, phosphorous-based, and potassium-based compounds. Under the conditions described above for embodiments schematically shown in FIG. 4, fertilizer plant 320 produces fertilizer product at a rate of about 27,000 tpy with a composition of about 7.8% nitrogen expressed as N, about 6.3% phosphorous expressed as $P_2O_5$, and about 8.1% potassium expressed as $K_2O$. As will be recognized by one of ordinary skill in the art, expressing amounts of nitrogen, potassium and phosphorous in fertilizers as N, $P_2O_5$ and $K_2O$, respectively, is a standard form of expressing such amounts.

Figure 5:
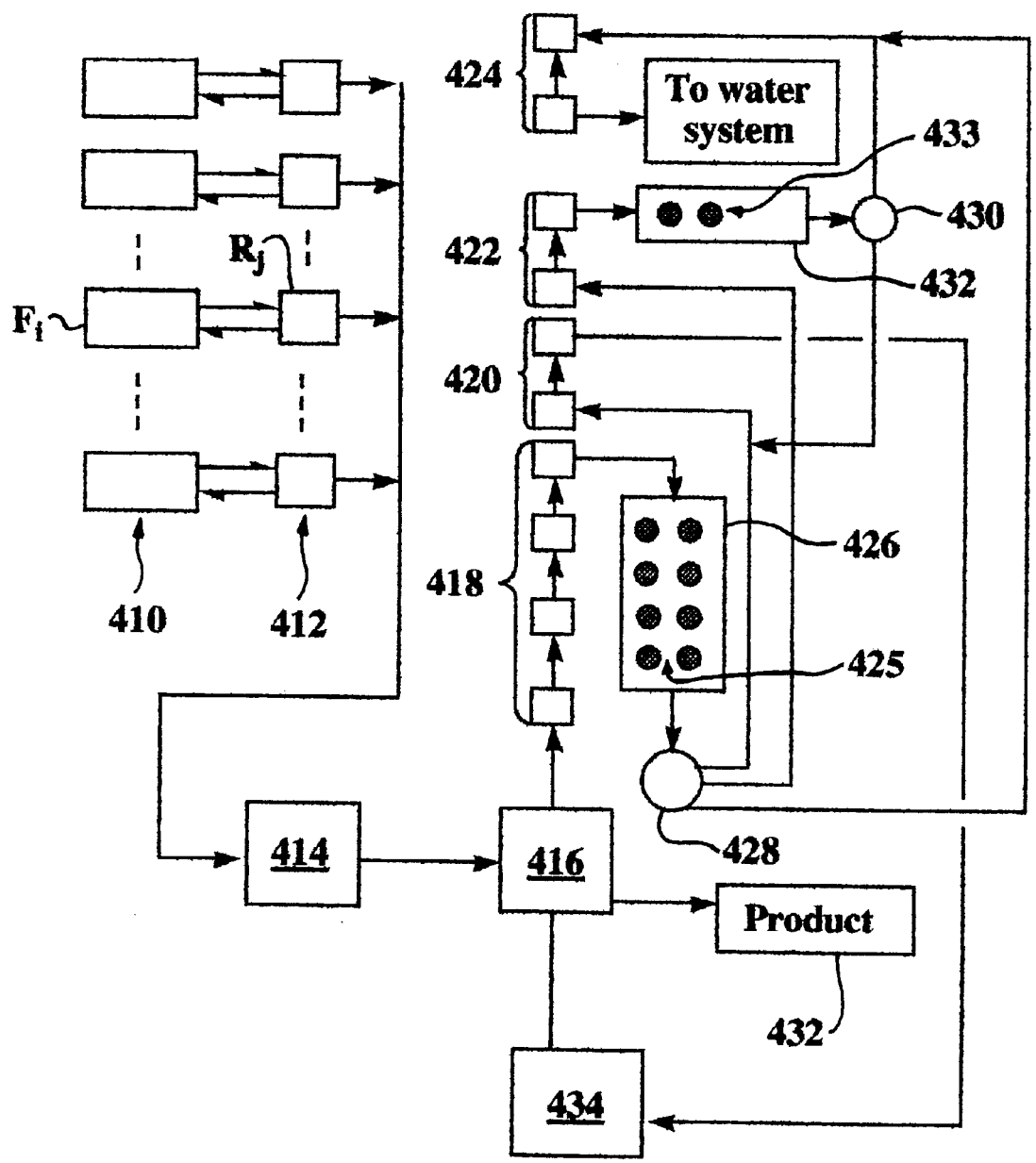
FIG. 5 schematically shows a flow chart for another embodiment of a system and process according to this invention.

FIG. 5 schematically shows a flow chart for another embodiment of the systems and processes according to the present invention. Farm complex 410 and recycling plant 412 are in this embodiment designed as the corresponding farm complex 310 and recycling plant 312 in FIG. 4. Accordingly, the terms $R_i$ and $F_i$ in FIG. 5 have the same meanings as the same terms in FIG. 4.

As shown in FIG. 5, organic waste from farm complex 410 is preferably treated in recycling plant 412 to produce waste processing effluents. These effluents are directed to process plant 414 which produces a cake product that is subsequently converted in fertilizer plant 416 into fertilizer product 432. As a waste product in the production of fertilizer, fertilizer product 416 generates end liquor that is subsequently directed to a containment facility. As shown in FIG. 5, this containment facility is preferably embodied by four lagoons 418 that receive end liquor from fertilizer plant 416 in a staged operation. Other embodiments of this invention comprise a different number of lagoons as an embodiment of this containment facility. Prior to the delivery into a containment facility, such as staged lagoons 418, the pH of the end liquor from fertilizer plant 416 is preferably brought to a value of approximately 7 by addition of a suitable acid. This acid is preferably sulfuric acid.

The end liquor is directed from lagoons 418 to spray field 426, where it is provided as feed fluid to a spray system 425. Spray system 425 is embodied according to FIG. 5 by eight spray elements such as eight spray nozzles, but this number is provided by way of a preferred example and not as a limitation.

As discussed with respect to FIGS. 3–4 and the multi-way flow control systems 140 and 321 shown therein, flow from spray fields 426 and 432 in the embodiment shown in FIG. 5 is preferably controlled with multi-way flow control systems 428 and 430, respectively. Preferred embodiments and ways of controlling these systems and limits for physical and/or chemical properties to control the collection of the different fractions from spray fields have been discussed hereinabove in the context of the embodiments shown in FIGS. 3–4 and the same discussion applies to systems 428 and 430.

The brine fraction with a high TDS concentration from spray field 426 is preferably directed to lagoons 420, which are illustratively embodied as shown in FIG. 5 by two lagoons that are preferably used for evaporation and thus concentration of this brine fraction. Following containment in lagoons 420, the concentrated brine is preferably directed to a pelletizing system 434 that is preferably located in fertilizer plant 416.

The brine fraction with an intermediate TDS concentration from spray field 426 is preferably directed to a containment facility that is illustratively embodied as shown in FIG. 5 by two lagoons 422. Following containment in lagoons 422, this brine fraction is directed to spray field 432 that comprises spray system 433. By way of example and not as a limitation, two spray elements such as two spray nozzles in this system 433 are shown in FIG. 5.

The embodiment shown in FIG. 5 shows multi-way flow control system 430 separating the flow from spray field 432 into two fractions, a purified water fraction that is directed to re-use, and a brine fraction that is directed to lagoons 420.

The purified water fraction from spray fields 426 and 432 is directed to a re-use application and it is preferably stored temporarily in a containment facility which is illustratively embodied as shown in FIG. 5 by a system of two lagoons 424. This purified water is preferably re-used in facilities such as farm complex 410, recycling plant 412, process plant 414, and fertilizer plant 416. Re-use of purified water according to the present invention leads in some embodiments to an outside fresh water consumption reduction of about ⅔. Furthermore, embodiments of this invention permit the recovery of about 98% of the nitrogen and potassium initially in the organic waste. The terms "potassium compounds" refer herein to the various potassium compounds typically found in organic waste, such as hog farmwaste. These terms also refer to the potassium compounds that are formed upon regulating the pH of the organic waste. For example, when the pH of the organic waste is regulated by adding sulfuric acid, these terms also include potassium sulfate and any form of hydrogen potassium sulfate that are thus formed.

Having discussed qualitative characteristics of embodiments schematically depicted in FIG. 5, quantitative and more specific illustrative parameter and design characteristics for the same embodiments are disclosed below. As indicated with respect to the embodiments schematically shown in the foregoing figures, it is understood that these parameter and design characteristics are meant to be illustrative and they are not provided by way of limitations. As in the example schematically depicted in FIG. 4, farm complex 410 comprises a plurality of farms $F_i$, where the subscript i labels individual farms and $1 \leq i \leq n$. As an example, n=10, and each farm $F_i$ houses 8000 hogs, so that farm complex 410 in this example houses 80,000 hogs. In this specific example, each farm $F_i$ is provided with a recycling plant $R_j$, where the subscript j labels individual recycling plants and $1 \leq j \leq m$. For the sake of simplicity, m=10 and j=i, which means that each individual farm has its own recycling plant. As indicated above, this illustrative relationship between farms and recycling plants is not a limitation of the present invention, but merely a specific illustrative embodiment and other embodiments comprise farm units and recycling plant units in different numbers, housing different head numbers, an operating according to a different ratio. For example, in another embodiment of this invention, a single recycling plant is associated with a plurality of farm units.

Waste processing effluent at a rate of about 150 gpm with a concentration of about 7% TS is directed to process plant 414. Under these conditions, process plant 414 produces about 13 tons per hour of wet cake product, which is supplied, with about 15.6 gpm of water to fertilizer plant 416. About 28,000 tpy of fertilizer product 432 are produced by fertilizer plant 416 which needs about 5.3 gpm, or about 8.6 af/yr, of additional water in its pelletizing system.

Fertilizer plant 416 generates end liquor at a rate of about 120 gpm, or about 194 af/yr, with about 1.5% TS. As indicated above, this liquor is preferably brought to a pH of about 7 with preferably sulfuric acid. It is well known in the art how to measure and control the pH, and in most embodiments of the present invention, pH control comprises bringing a pH of about 11 to a value of about 7. As shown in FIG. 5, the resultant liquor is then directed to lagoons 418 and it is directed from there to spray field 426 at preferably a rate of about 154 af/yr. In embodiments in which spray field 426 is operated only for about 1000 h during winter time, the feed fluid from lagoons 418 is supplied to spray field 426 at a rate of about 834 gpm during the approximately 1000-h period of freezing or sub-freezing conditions.

Spray field 426 preferably provides a surface of about 10 acres with a slope to favor fluid flow of about 3%. A brine fraction with a concentration of at least 10,000 TDS at about 30 af/yr is separated and directed to lagoons 420, where the brine is preferably further concentrated by evaporation. These lagoon system preferably comprises two lagoons, one deep lagoon and one shallow lagoon, from which the concentrated brine is directed to pelletizing unit 434 at a rate of about 8 gpm and preferably near saturation.

Purified water with at most about 1000 ppm TDS is directed from spray field 426 to a re-use facility or to storage lagoons 424 at a rate of about 75 af/yr. Brine with TDS concentrations of less than about 10,000 ppm and more than about 1000 ppm is preferably directed to lagoons 422 at a rate of about 50 af/yr, and it is subsequently fractioned in spray field 432. Because of volume reduction by evaporation in lagoons 424, the rate at which feed fluid is supplied to spray field 432 is in such preferred embodiments about 30 af/yr. Spray field 432 preferably provides a surface area of about 2 acres.

Purified water from spray field 432 with a TDS concentration of preferably not more than about 1000 ppm is directed to re-use or to storage lagoons 424 at a rate of about 25 af/yr. The brine fraction obtained in spray field 432 at a rate of about 5 af/yr is preferably directed to lagoons 420. Purified water is produced by the embodiment shown in FIG. 5 at a rate of about 100 af/yr from spray fields 426 and 432. This amount of purified water is about 67% of the fresh water required by the 80,000-head hog farm that embodies farm complex 410 in this example.

As indicated above, flow destination in systems 428 and 430 is preferably controlled by conductivity measurements of the fluid flow. However, other embodiments of this invention utilize the measurement of other physical and or chemical properties.

Lagoons 418, 420, 422, and 424 are in some sites part of existing containment facilities, in which case they can be used for the purposes described above in embodiments of the present invention. These lagoons are typically 5-acre lagoons with a capacity of about 100 af each.

It has been observed in embodiments of this invention that most of the potassium sulfate is separated with the brine fraction. Furthermore, it follows from the foregoing description of illustrative embodiments of the present invention that nutrients are recovered from organic waste without having to resort to crystallization, and no land application of residual waste is needed.

It follows from the foregoing description of illustrative embodiments of the present invention that nutrients and purified water are recovered from organic waste without resorting to conventional primary treatment of the organic waste. This conventional primary treatment relies on the holding of the organic waste in lagoons right after it is obtained from the farms, and it is also known as lagoon primary treatment. Conventional primary treatment leads to a sediment that is typically discarded in the form of land application and a supernatant solution whose physical and chemical characteristics are entirely different from and considerably simpler than those of the organic waste feed fluid that is treated according to the present invention. The supernatant solution obtained from the lagoons in the conventional primary treatment is obtained after various aerobic and anaerobic processes have changed the physical and chemical composition of the waste. In doing so, however, big volumes of gases are released into the atmosphere, large surface areas are occupied by the primary treatment lagoons, and large masses of sediments are accumulated and discarded as land application. This conventional practice has come under increasing scrutiny because of its detrimental environmental consequences. The treatments in the recycling and/or process plants such as plants 104, 106, 312, 314, 318, 316, 412, and 414 in embodiments of this invention permit organic waste treatment without resorting to primary treatment and avoid the drawbacks of the conventional primary treatment practice. The fluid obtained from such recycling and/or process plants is still a complex organic waste that includes setteable and nonsettleable materials such as suspended and dissolved solids, including fine solids of predominantly organic origin, various biomaterials and bio-related materials, various inorganic materials and their complexed and combined forms with the bio and bio-related materials, such materials being present in the complex organic waste in a variety of aggregation and phsyicochemical forms such as solution, suspension, and colloidal forms.

The term "directed" has been used in the foregoing examples in relation to matter flow direction. It is understood that this term refers to an appropriate transport or to an appropriate cause of flow of the matter to which it is applied. For example, when a fluid is directed from A to B, this expression means that the fluid either flows from A to B by gravity or by appropriate pumping. Because pumping and related causes of flow are within the ordinary skill in the art, no further discussion of this matter is provided here.

Temporary storage of purified water, feed fluid and brine fractions in embodiments of this invention can be accomplished by accumulation of any one of such fluids in lagoons, that are sometimes referred to as containment lagoons. In this sense, holding ponds, storage reservoirs, and lagoons perform the function of containment lagoons and they can be so designated. It is to refer to this containment function that the terms containment lagoons can be applied to features of embodiments of this invention such as features 324, 330, 332, 418, 420, 422, and 424.

Figure 6A:
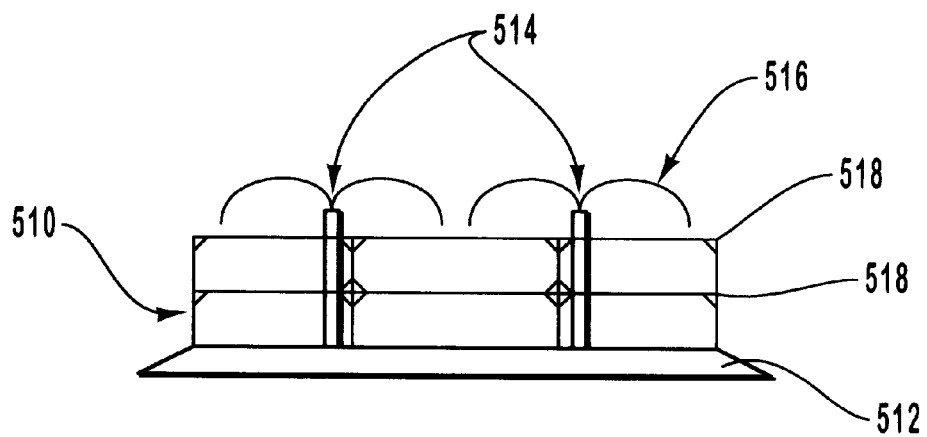
FIGS. 6A–6B schematically show a side view (6A) and a top view (6B) of an example of an ice formation grating configuration.
Figure 6B:
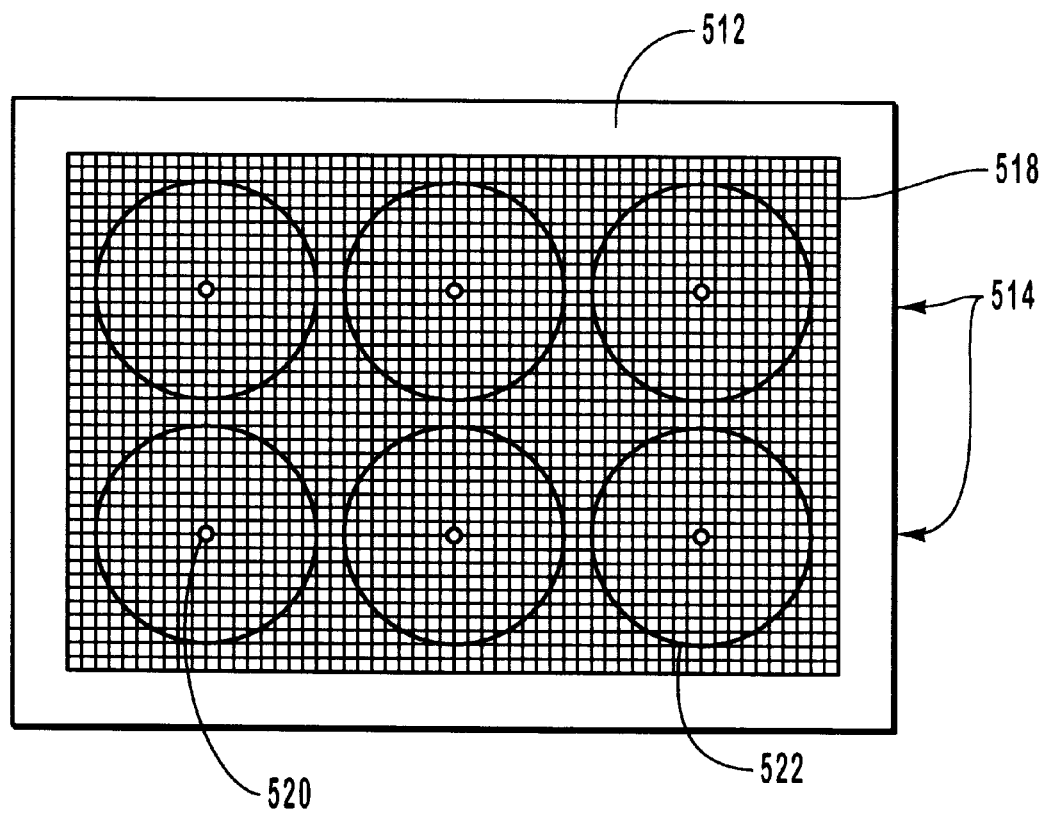

Embodiments of the present invention include at least one tier of ice formation mesh or grating 510 as shown in FIGS. 6A–6B. The embodiment depicted in FIGS. 6A–6B show for illustrative, but not limiting, purposes two tiers 518 of mesh or grating that is embodied in some embodiments by wire mesh. As shown in FIGS. 6A–6B, sprays 514 spray feed fluid 516 in approximate spray patterns 522, and purified water in the form of ice forms in appropriate ambient conditions throughout mesh or grating 518. This ice typically hangs from mesh or grating 518.

Configurations of embodiments of this invention including ice formation mesh or gratings provide an increased surface area for cooling and ice formation, thus leading to a reduction in the area of the ice field such as spray field 512. These configurations further improve efficiency in the separation between fractions. Factors that lead to this improved separation with configurations that include ice formation mesh or grating comprise the facilitation of a quicker runoff and the reduction in pooling of the various fractions in the ice field such as spray field 512. Accordingly, a purified water fraction is predominantly retained as ice formed on and throughout the mesh or grating, and a brine fraction is predominantly collected in spray field 512. Encapsulation of solids and other impurities in the solid purified water fraction is thus minimized and the treatment of the complex organic waste feed fluid according to this invention is thus made more effective. Conditions such as maintaining a fluid flow of the brine fraction or fractions, collecting the purified water fraction as ice on and throughout an ice formation grating, and combinations thereof are preferred conditions to effectively treat complex organic waste feed fluid according to embodiments of this invention. It has been found that spray conditions of conventional water treatment methods that are implemented without the brine fluid flow conditions and/or ice formation grating as taught in the context of this invention do not lead to the effective treatment of and formation of separated fractions from the complex organic waste feed fluid treated as disclosed herein.

Figure 6C:
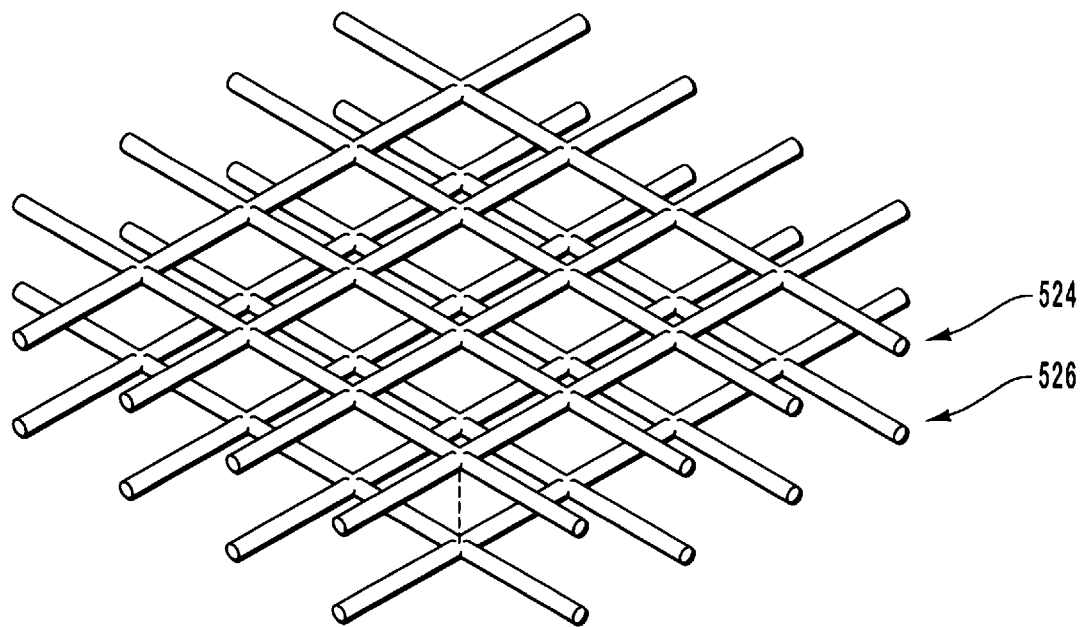
FIGS. 6C–6D illustrate respectively perspective and top views of a portion of an embodiment of a matched ice formation grating configuration (6C), and of a portion of an opposition ice formation grating configuration (6D).

Embodiments of this invention that include ice formation mesh or grating (that is referred to herein as "ice formation grating", whether it is embodied in particular by a mesh, by a grating, or by a combination of mesh and grating) in the form of more than one tier of ice formation grating, are provided with matched ice formation grating in the various tiers. Matched ice formation grating refers to an arrangement of the successive tiers of ice formation grating in which the contours of the holes in the grating of one tier project vertically into corresponding holes in the other tiers. A portion of an illustrative embodiment of a matched ice formation grating configuration is schematically illustrated in FIG. 6C, where gratings in two tiers 524 and 526 are shown as projecting on each other in the perspective view depicted therein. This feature is indicated in FIG. 6C by the vertical dash line that is shown only for two nodes, and that is understood to apply to the other nodes in each of the gratings depicted in FIG. 6C.

Figure 6D:
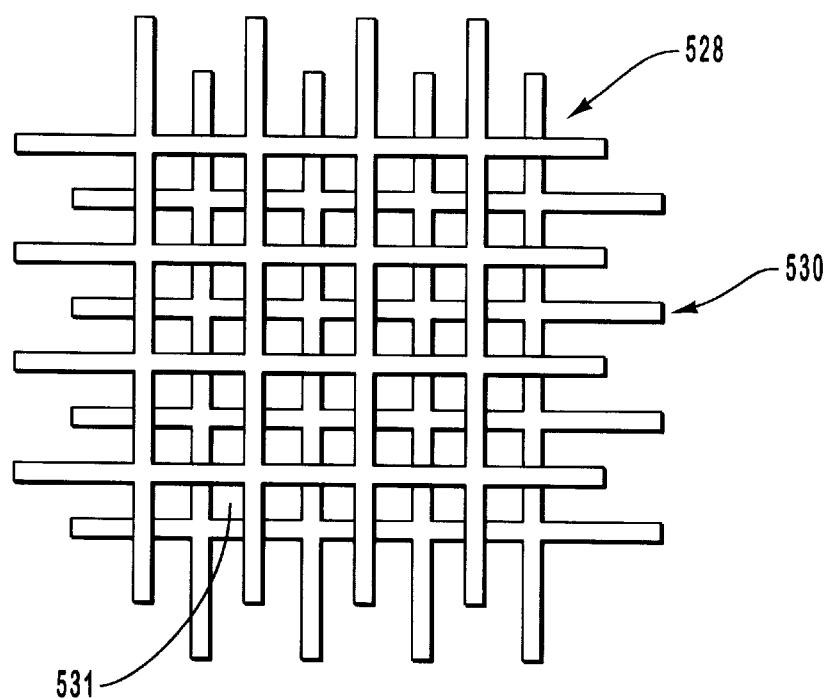

Other embodiments are provided with an opposition ice formation grating in which the material elements in the grating in a tier obstruct the fluid flow running from and through the holes in the grating in a higher tier, thus forcing the fluid flow running down and through the grating to follow a tortuous and longer path to increase the heat loss and/or evaporative loss of the sprayed fluid. A portion of an illustrative embodiment of an opposition ice formation grating configuration is schematically illustrated in FIG. 6D, where gratings in a tier 528 is shown as projecting on the holes of a lower tier 530 in the top view depicted therein.

It is understood that holes in ice formation grating embodiments of this invention can have any one amongst a variety of perimeters, such as polygonal, curved, and combinations thereof. It is also understood that the embodimetns shown in FIGS. 6C–6D represent illustrative embodiments of limit configurations, and that additional configurations according to this invention are embodied by relative positioning of grating tiers that are comprised between the limit forms shown in FIGS. 6C–6D. For example, another embodiment would be illustrated by a relative tier configuration in which the intersections of the grating elements in one tier project off-center relative to the respective holes in a neighboring tier.

Still other embodiments of this invention are provided with ice formation grating in which at least one tier of grating can controllably be shifted in position relative to the position of a neighboring tier so that the ice formation grating configuration can be used in a matched ice formation grating configuration at some times and in an opposition ice formation grating configuration at other times. Choice of matched ice formation grating configuration, opposition ice formation grating configuration, or a combination thereof when at least three tiers are used depends on the desired effective heat exchange rate and/or evaporation rate.

The implementation of embodiments of the systems and methods of the present invention is more cost effective when operations such as freeze/thaw cycles and evaporations are performed with the assistance of favorable ambient conditions. Information obtainable from the National Weather Service, or from homologous services, is used to optimize the cost effectiveness of embodiments of the systems and methods of the present invention. As an example that is meant to be illustrative and not limiting of the implementation of embodiments of this invention, meteorological data for Bethany, Missouri, is provided hereinbelow.

Meteorological records for Missouri indicate that this state's climate can support cost effective implementations of embodiments of this invention. Weather data for Bethany indicate a mean average precipitation of 36 inches, with extreme records over a 103-year recording period of 61.4 inches and 17.8 inches. Data from national weather maps indicate a gross evaporation of approximately 50 inches/year. Evaporation from pond surfaces is expected to be approximately 70% of the Class A Pan data.

Meteorological records for Bethany reveal the mean and extreme temperatures (° F.) during winter months given in Table 1.

| Month | Maximum | Minimum | Mean |
| --- | --- | --- | --- |
| November | 50.5 | 29.1 | 39.8 |
| December | 35.7 | 17.2 | 26.5 |
| January | 31.8 | 11.1 | 21.5 |
| February | 37.8 | 15.4 | 26.6 |
| March | 50.3 | 26.7 | 38.5 |

Seasonal hours at freezing conditions of 32° F. or lower is estimated from National Weather Service data at 1700 hours. Even if temperatures of not more than 32° F. are reached for about 1000 hours/season, embodiments of the present invention can still be implemented by relying on ambient conditions to achieve a cost effective operation. To enhance ice production, embodiments of the present invention preferably include the capability to increase flow rates at lower ambient temperatures.

As indicated above, use of pond evaporation is enhanced with both seasonal staging and summer time use of the spray fields as spray evaporation facilities (active evaporation). Seasonal staging can be achieved, for example, by using deep ponds during winter to minimize dilution and by using shallow ponds in summer to enhance evaporation. Evaporation from ponds is referred to as passive evaporation.

Embodiments of the present invention are envisaged to operate at lower cost when they are implemented in regions that combine cold winters with high summer time evaporation rates. Preferably, annual hours at or below freezing is at least about 500 hours. Pressure and temperature conditions for ambient freezing can be found with ordinary skill in the art in standard weather reference material.

Embodiments of the present invention are preferably operated under conditions such that a purified water fraction separates in the form of ice and a brine fraction separates in fluid form. It is understood that under cold enough ambient conditions, even brine fractions can solidify after the feed fluid is sprayed, in which case separation and collection of the different fractions is achieved upon gradual thawing of the solid fractions in the spray field. As indicated hereinabove, the different fractions are then selected and collected separately according to the detected change in some relevant physical property by a suitable sensor of the fluid running from the ice field. An example of such physical property is the electrical conductivity. Embodiments of this invention operating under these conditions are said to be operating in a complete freeze regime. As indicated hereinabove, the most preferred work regime for embodiments of this invention is the separation of a purified water fraction in solid form while the brine fraction or fractions remain in fluid form.

Under ambient conditions such as high enough temperature and/or low enough ambient humidity, embodiments of the present invention can be employed to concentrate feed fluid by evaporating water from the sprayed fluid. This fluid is then collected as a more concentrated fluid in the ice field.

It follows from the foregoing description of illustrative embodiments of the present invention that these methods and systems lead to the effective treatment of organic waste, such as hog farm waste, in a manner such that no significant residual discharge of liquids and/or solids into the environment is needed. This residual discharge is known as land application of residual waste. The processing of the organic waste prior to the implementation of the systems and methods of the present invention and the avoidance of the conventional primary treatment in such processing leads to the avoidance of significant discharge of gas material into the atmosphere. Water is recovered as purified water that can be used in the farm and/or organic waste treatment facilities themselves, and the great variety of organic and inorganic materials in the organic waste is recovered as fertilizer.

Figure 7:
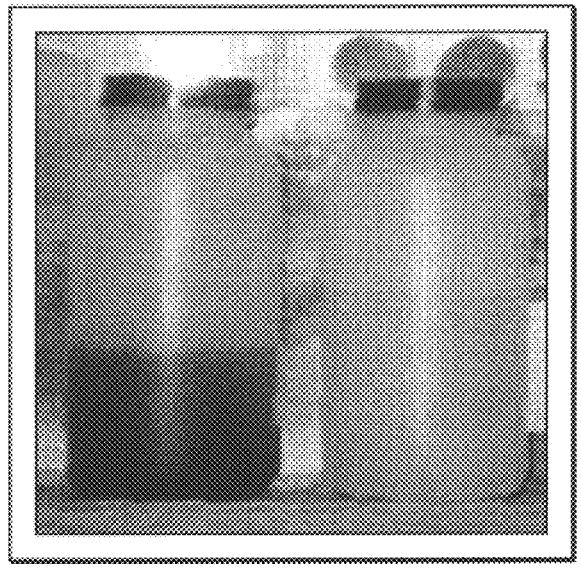
FIG. 7 shows the image of a sample of organic waste feed fluid that was treated according to the present invention (container with dark fluid) and a sample of purified water fraction (container with clear liquid) that was separated from the same type of feed fluid according to the present invention.

FIG. 7 shows a sample of organic waste feed fluid that was treated according to the present invention (container with dark fluid) and a sample of purified water fraction (container with clear liquid) that was separated from the same type of feed fluid according to the present invention. In contrast with the complex compositional and aggregation characteristics of the feed fluid displayed in the left container in FIG. 7, the right container shows clear fresh water that is separated as purified water according to the present invention and can be used in fresh water applications, such as fresh water supply to farm, organic waste treatment and fertilizer plants, and for agricultural purposes. As indicated above, the purified water separated according to the present invention contains TDS at not more than 1000 ppm and fractions have been separated with TDS of about 200 ppm.

Figure 8:
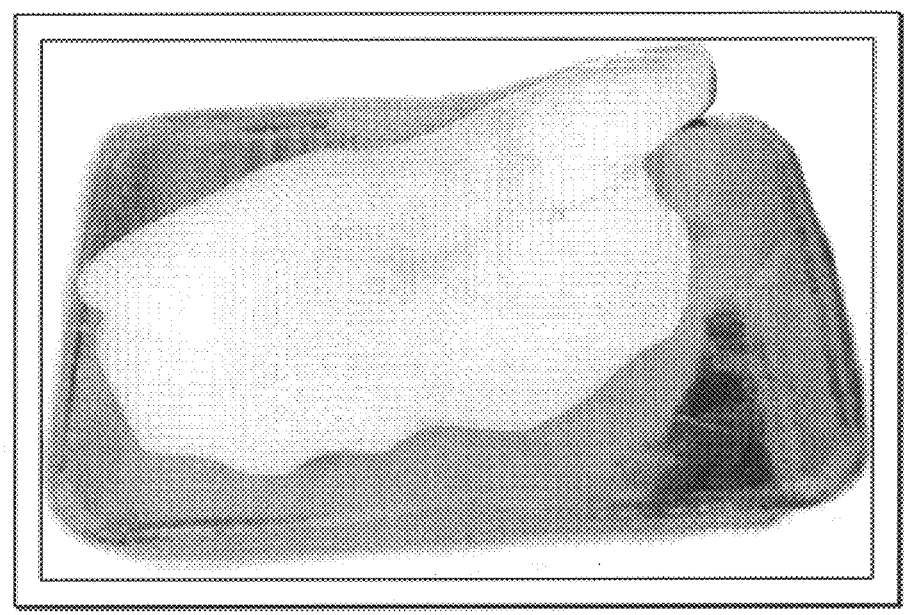
FIG. 8 shows a sample of purified water fraction as ice that was separated from organic waste feed fluid in a separation process according to the present invention.

FIG. 8 shows a sample of purified water fraction as ice that was separated from organic waste feed fluid in a separation process according to the present invention. As shown in this picture, this fraction constitutes fresh water in clear contrast with the complex organic waste feed fluid from which this purified water fraction is separated.

The schematic diagrams shown in FIGS. 1–6 are not meant to be mutually exclusive. On the contrary, features represented in these figures and corresponding embodiments can be suitably combined to generate additional embodiments of the present invention. These additional combinations however, can be performed with the aid of the objectives and teachings herein contained and ordinary skill in the art; thus no other combinations are offered as additional explicit examples.

The present invention may be embodied in other specific forms without departing from its spirit or essential characteristics. The described embodiments are to be considered in all respects only as illustrative and not restrictive. All changes which come within the meaning and range of equivalency of the matter herein disclosed are to be embraced within the scope of this invention.

What is claimed includes:

1. A method for treating organic waste supplied as feed fluid, the treatment method being free of land application of residual waste, comprising:
   (a) providing organic waste that has not been treated according to a lagoon primary treatment;
   (b) directing said organic waste in the form of feed fluid to a first spray field having an spray system, and
   (c) separating initial fractions from the feed fluid by spraying the feed fluid in said first spray field under external ambient atmospheric conditions, thus producing initial fractions, one of said initial fractions being a first brine fraction that is obtained in liquid form on said first spray field.

2. The method recited in claim 1, wherein said first purified water fraction is obtained in the form of ice.

3. The method recited in claim 1, wherein another of said initial fractions is a first purified water fraction with a TDS concentration in the range from about 200 ppm to about 4000 ppm.

4. The method recited in claim 1, further comprising:
   (d) directing said first brine fraction to a second spray field having a spray system; and
   (e) separating said first brine fraction into secondary fractions by spraying said first brine fraction in said second spray field under external ambient atmospheric conditions, thus producing secondary fractions, one of said secondary fractions being a second purified water fraction with a TDS concentration in the range from about 200 ppm to about 4000 ppm, and another of said secondary fractions being a second brine fraction.

5. The method recited in claim 4, wherein said second purified water fraction is obtained in the form of ice.

6. The method recited in claim 4, further comprising supplying said first brine fraction to said spray system in said second spray field at a flow rate such that said second brine fraction is obtained in fluid form on said second spray field.

7. The method recited in claim 4, further comprising directing at least one of said first and second brine fraction in fluid form to a fertilizer plant for fertilizer recovery treatment.

8. The method recited in claim 4, wherein said second spray field comprises an ice formation grating, and wherein said second purified water fraction is formed as ice on said ice formation grating.

9. The method recited in claim 1, further comprising directing said first brine fraction in fluid form to a fertilizer plant for fertilizer recovery treatment.

10. The method recited in claim 1, wherein said first spray field comprises an ice formation grating, and wherein said first purified water fraction is formed as ice on said ice formation grating.

11. A method for treating organic waste supplied as feed fluid, the treatment method being free of land application of residual waste, comprising:
   (a) providing organic waste that has not been treated according to a lagoon primary treatment;
   (b) concentrating said feed fluid by spraying the feed fluid in a spray field through a first spray system, thus producing a concentrated feed fluid;
   (c) collecting said concentrated feed fluid;
   (d) separating said concentrated feed fluid into initial fractions by spraying the concentrated feed fluid in a first spray field under external ambient atmospheric conditions, thus producing initial fractions, one of said initial fractions being a first purified water fraction with a TDS concentration in the range from about 200 ppm to about 4000 ppm, and another of said initial fractions being a first brine fraction; and
   (e) supplying said feed fluid to said spray system at a flow rate such that said first brine fraction is obtained in fluid form on said first spray field.

12. The method recited in claim 11, further comprising:
   (f) directing said first brine fraction to a second spray field having a second spray system;
   (g) separating said second brine fraction into secondary fractions by spraying said first brine fraction in said second spray field under external ambient atmospheric conditions, thus producing secondary fractions, one of said secondary fractions being a second purified water fraction with a TDS concentration in the range from about 200 ppm to about 4000 ppm, and another of said secondary fractions being a second brine fraction; and
   (h) supplying said first brine fraction to said second spray system at a flow rate such that said second brine fraction is obtained in fluid form on said second spray field.

13. The method recited in claim 12, further comprising directing at least one of said first brine fraction and said second brine fraction to a fertilizer plant for fertilizer recovery treatment.

14. The method recited in claim 11, further comprising directing said first brine fraction in fluid form to a fertilizer plant for fertilizer recovery treatment.

15. A method for treating organic waste supplied as feed fluid, the treatment method being free of land application of residual waste, comprising:
   (a) providing organic waste that has not been treated according to a lagoon primary treatment;
   (b) directing said organic waste in the form of feed fluid to a first spray field having a spray system and a first ice formation grating;
   (c) separating initial fractions from the feed fluid by spraying the feed fluid in said first spray field under external ambient atmospheric conditions, thus producing initial fractions, wherein one of said initial fractions comprises a first purified water fraction with a TDS concentration in the range from about 200 ppm to about 4000 ppm, wherein said first purified water fraction is formed as ice on said ice formation grating, and wherein another of said initial fractions comprises a first brine fraction;
   (d) supplying said feed fluid to said spray system at a flow rate such that said first brine fraction is obtained in fluid form on said first spray field;
   (e) thawing said first purified water fraction that is formed as ice, thus forming a first purified liquid water fraction flow on said first spray field; and
   (f) collecting and directing said first purified liquid water fraction flow according to the electrical conductivity of said flow, so that said first purified liquid water fraction is collected separately from said first brine fraction.

16. The method recited in claim 15, wherein said first ice formation grating comprises a matched ice formation grating.

17. The method recited in claim 15, wherein said first ice formation grating comprises an opposition ice formation grating.

18. The method recited in claim 15, further comprising:
   (g) directing said first brine fraction to a second spray field having a second spray system and a second ice formation grating;
   (h) separating secondary fractions from the first brine fraction by spraying said first brine fraction under external ambient atmospheric conditions, thus producing secondary fractions, wherein one of said secondary fractions comprises a second purified water fraction with a TDS concentration in the range from about 200 ppm to about 4000 ppm, wherein said second purified water fraction is formed as ice on said second ice formation grating, and wherein another of said secondary fractions comprises a second brine fraction;
   (i) supplying said first brine fraction to said second spray system at a flow rate such that said second brine fraction is obtained in fluid form on said second spray field;
   (j) thawing said second purified water fraction that is formed as ice, thus forming a second purified water fraction flow on said second spray field; and
   (k) collecting and directing said second purified liquid water fraction flow according to the electrical conductivity of said flow, so that said second purified liquid water fraction is collected separately from said second brine fraction.

19. The method recited in claim 18, further comprising directing at least one of said first brine fraction and said second brine fraction to a fertilizer plant for fertilizer recovery treatment.

20. A method for treating organic waste supplied as feed fluid, the treatment method being free of land application of residual waste, comprising:
   (a) providing organic waste that has not been treated according to a lagoon primary treatment;
   (b) directing said organic waste in the form of feed fluid to a first spray field having a spray system;
   (c) separating initial fractions from the feed fluid in said first spray field by spraying the feed fluid in said first spray field under external ambient atmospheric conditions, thus producing initial fractions, one of said initial fractions being a first purified water fraction with a TDS concentration in the range from about 200 ppm to about 4000 ppm, and another of said initial fractions being a first brine fraction;
   (d) supplying said feed fluid to said spray system at a flow rate such that said first brine fraction is obtained in fluid form on said first spray field;
   (e) directing said first brine fraction to a lagoon system;
   (f) directing said first brine fraction from said lagoon system to a second spray field having a spray system; and
   (g) separating secondary fractions from said first brine fraction in said second spray field by spraying the first brine fraction in said second spray field under external ambient atmospheric conditions, thus producing secondary fractions, one of said secondary fractions being a second purified water fraction with a TDS concentration in the range from about 200 ppm to about 4000 ppm, and another of said secondary fractions being a second brine fraction; and
   (h) supplying said first brine fraction to said spray system in said second spray field at a flow rate such that said second brine fraction is obtained in fluid form on said second spray field.

21. The method recited in claim 20, wherein at least one of said first and second spray fields comprises an ice formation grating.

22. The method recited in claim 21, wherein said ice formation grating is selected from the group consisting of matched ice formation grating, opposition ice formation grating, and combinations thereof.

23. A method for treating organic waste supplied as feed fluid, the treatment method being free of land application of residual waste, comprising:
   (a) providing organic waste that has not been treated according to a lagoon primary treatment;
   (b) directing said organic waste in the form of feed fluid to a first spray field having an spray system;
   (c) separating initial fractions from the feed fluid in said first spray field by spraying the feed fluid in said first spray field under external ambient atmospheric conditions, thus producing initial fractions, one of said initial fractions being a first purified water fraction with a TDS concentration in the range from about 200 ppm to about 4000 ppm, another of said initial fractions being a first brine fraction, and another of said initial fractions being a second brine fraction, wherein the TDS of said second brine fraction is greater than the TDS of said first brine fraction, and the TDS of said first brine fraction is greater than the TDS of said first purified water fraction;

(d) supplying said feed fluid to said spray system at a flow rate such that said first brine fraction is obtained in fluid form on said first spray field;

(e) directing said second brine fraction to a fertilizer plant for fertilizer recovery treatment;

(f) directing said second brine fraction to a second spray field having an spray system;

(g) separating secondary fractions from said second brine fraction in said second spray field by spraying the second brine fraction in said second spray field under external ambient atmospheric conditions, thus producing secondary fractions, one of said secondary fractions being a second purified water fraction with a TDS concentration in the range from about 200 ppm to about 4000 ppm; and another of said secondary fractions being a third brine fraction;

(h) supplying said second brine fraction to said spray system in said second spray field at a flow rate such that said third brine fraction is obtained in fluid form on said second spray field; and (i) directing said third brine fraction to a fertilizer plant for fertilizer recovery treatment.

24. The method recited in claim 23, wherein at least one of said first and second spray fields comprises an ice formation grating.

25. The method recited in claim 24, wherein said ice formation grating is selected from the group consisting of matched ice formation grating, opposition ice formation grating, and combinations thereof.

26. A method for treating organic waste and recovering potassium components thereof, the organic waste being supplied as feed fluid and the treatment method being free of land application of residual waste, comprising:

(a) providing organic waste that has not been treated according to a lagoon primary treatment;

(b) regulating the pH of said organic waste to a value of about 7 to produce pH-controlled feed fluid;

(c) directing said pH-controlled feed fluid to a first spray field having a spray system;

(d) separating initial fractions from said pH-controlled feed fluid in said first spray field by spraying the pH-controlled feed fluid in said first spray field under external ambient atmospheric conditions, thus producing initial fractions, one of said initial fractions being a purified water fraction with a TDS concentration in the range from about 200 ppm to about 4000 ppm, and another of said initial fractions being a brine fraction that has a concentration in potassium compounds that is greater than the concentration in potassium compounds of the pH-controlled feed fluid;

(e) supplying said feed fluid to said spray system at a flow rate such that said brine fraction is obtained in fluid form on said first spray field; and (f) directing said brine fraction to a fertilizer plant for potassium compound recovery treatment.

27. The method recited in claim 26, further comprising concentrating said brine fraction prior to said directing said brine fraction to a fertilizer plant.

28. The method recited in claim 26, wherein said spray field comprises an ice formation grating.

29. A system for treating organic waste supplied as feed fluid that has not been treated according to a lagoon primary treatment, comprising:

(a) a slanted spray field with an elevation gradient, said slanted spray field being exposed to external ambient atmospheric conditions, wherein said elevation gradient facilitates the evacuation of fluid from said spray field in the form of evacuated fluid;

(b) a spray system to spray over said slanted spray field, and under external ambient atmospheric conditions, feed fluid that has not been treated according to a lagoon primary treatment, thus forming sprayed organic waste, wherein said spray system provides sprayed organic waste in the form of droplets within a spray pattern; and (c) an ice formation grating on said spray field, such that said spray pattern is over said ice formation grating.

30. The system recited in claim 29, wherein said evacuated fluid has an electrical conductivity, and further comprising an electrical conductivity-controlled flow control device for separating said evacuated fluid according to said electrical conductivity.

31. The system recited in claim 29, wherein said evacuated fluid has an index of refraction, and further comprising a refractometer-controlled flow control device for separating said evacuated fluid according to said index of refraction.

32. The system recited in claim 29, wherein said spray system extends through and above said ice formation grating.

33. The system recited in claim 29, further comprising a sensor-controlled flow control device for separating said evacuated fluid into a purified water fraction and a brine fraction.

34. The system recited in claim 33, further comprising a brine fraction containment lagoon.

35. The system of claim 33 further comprising a purified water containment lagoon.

36. The system recited in claim 29, further comprising a feed fluid containment lagoon.

37. A system for treating organic waste supplied as feed fluid that has not been treated according to a lagoon primary treatment, comprising:

(a) a slanted spray field with an elevation gradient, said slanted spray field being exposed to external ambient atmospheric conditions, wherein said elevation gradient facilitates the evacuation of fluid from said spray field in the form of evacuated fluid;

(b) a spray system to spray over said slanted spray field, and under external ambient atmospheric conditions, feed fluid that has not been treated according to a lagoon primary treatment, thus forming sprayed organic waste, wherein said spray system provides sprayed organic waste in the form of droplets within a spray pattern;

(c) an ice formation grating on said spray field, such that said spray pattern is over said ice formation grating; and (d) a sensor-controlled flow control device for separating said evacuated fluid into a purified water fraction, a first brine fraction with a first TDS concentration, and a second brine fraction with a second TDS concentration, wherein said second TDS concentration is greater than said first TDS concentration.

38. The system recited in claim 37, further comprising:

(e) a second slanted spray field with a second elevation gradient, said second slanted spray field being exposed to external ambient atmospheric conditions, wherein said second elevation gradient facilitates the evacuation of fluid from said second spray field in the form of evacuated fluid;

(f) a second spray system to spray over said second slanted spray field, and under external ambient atmospheric conditions, said first brine fraction that has been evacuated from said first slanted spray field, thus forming sprayed brine, wherein said second spray system provides sprayed brine in the form of droplets within a second spray pattern; and (g) a second ice formation grating on said second spray field, such that said second spray pattern is over said second ice formation grating.

39. The system recited in claim 37, further comprising a feed fluid containment lagoon.

40. The system recited in claim 37, further comprising an evaporation field that is exposed to external ambient atmospheric conditions, so that at least one of said feed fluid, said first brine fraction and said second brine fraction are concentrated in said evaporation field.

* * * * *

UNITED STATES PATENT AND TRADEMARK OFFICE
CERTIFICATE OF CORRECTION

PATENT NO.    : 6,508,078 B2
DATED         : January 21, 2003
INVENTOR(S)   : Larry P. Sower It is certified that error appears in the above-identified patent and that said Letters Patent is hereby corrected as shown below:

<u>Column 17,</u>
Line 37, before "spray" change "an" to -- a --
Line 55, after "farm" insert -- . --

Signed and Sealed this

Twenty-fifth Day of March, 2003

JAMES E. ROGAN
*Director of the United States Patent and Trademark Office*